(12) United States Patent
Culver

(10) Patent No.: US 7,889,174 B2
(45) Date of Patent: *Feb. 15, 2011

(54) TACTILE FEEDBACK INTERFACE DEVICE INCLUDING DISPLAY SCREEN

(75) Inventor: Craig F. Culver, Woodside, CA (US)

(73) Assignee: Immersion Corporation, San Jose, CA (US)

( * ) Notice: Subject to any disclaimer, the term of this patent is extended or adjusted under 35 U.S.C. 154(b) by 1058 days.

This patent is subject to a terminal disclaimer.

(21) Appl. No.: 11/594,668

(22) Filed: Nov. 8, 2006

(65) Prior Publication Data

US 2007/0052674 A1 Mar. 8, 2007

Related U.S. Application Data

(63) Continuation of application No. 09/875,458, filed on Jun. 5, 2001, now Pat. No. 7,151,527, which is a continuation of application No. 09/203,908, filed on Dec. 1, 1998, now Pat. No. 6,256,011.

(60) Provisional application No. 60/067,382, filed on Dec. 3, 1997, provisional application No. 60/067,381, filed on Dec. 3, 1997.

(51) Int. Cl.
*G09G 5/00* (2006.01)
(52) U.S. Cl. ............... 345/156; 345/157; 345/167; 345/173; 345/184
(58) Field of Classification Search ......... 345/156–157, 345/167, 173, 184
See application file for complete search history.

(56) References Cited

U.S. PATENT DOCUMENTS 2,524,782 A 10/1950 Ferrar et al.

(Continued)

FOREIGN PATENT DOCUMENTS

EP 0265011 4/1988

(Continued)

OTHER PUBLICATIONS

Adelstein, B., A Virtual Environment System for the Study of Human Arm Tremor, Submitted to the Dept. of Mechanical Engineering in partial fulfillment of the requirements for the degree of Doctor of Philosophy at the Massachusetts Institute of Technology, Jun. 1989, pp. 1-253.

(Continued)

*Primary Examiner*—Amr Awad
*Assistant Examiner*—Leonid Shapiro
(74) *Attorney, Agent, or Firm*—Kilpatrick Townsend & Stockton LLP

(57) ABSTRACT

A control device including a housing and a carrier moveable with respect to the housing in a first rotary degree of freedom. A first sensor senses the movement of the carrier and outputs a first control signal. A roller rotatably coupled to the carrier rotates with the carrier in the first degree of freedom and rotates independently of the carrier in a second rotary degree of freedom. A second sensor senses rotary motion of the roller and outputs a second control signal. Preferably, an arm member coupled between carrier and housing pivots about an axis. A third sensor, such as a switch, can be used to detect when the carrier has been pushed in a direction substantially orthogonal to a plane of rotation of the arm member. Force feedback can also be provided in the rotary degrees of freedom of the control device.

15 Claims, 9 Drawing Sheets

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,490,059 A | 1/1970 | Paulsen et al. |
| 3,497,868 A | 2/1970 | Hirsch |
| 3,517,446 A | 6/1970 | Corlyon et al. |
| 3,623,046 A | 11/1971 | Scourtes |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 4,050,265 A | 9/1977 | Drennen et al. |
| 4,103,155 A | 7/1978 | Clark |
| 4,125,800 A | 11/1978 | Jones |
| 4,148,014 A | 4/1979 | Burson |
| 4,160,508 A | 7/1979 | Salisbury |
| 4,236,325 A | 12/1980 | Hall et al. |
| 4,262,549 A | 4/1981 | Schwellenbach |
| 4,311,980 A | 1/1982 | Prusenziati |
| 4,333,070 A | 6/1982 | Barnes |
| 4,385,836 A | 5/1983 | Schmitt |
| 4,391,282 A | 7/1983 | Ando et al. |
| 4,400,790 A | 8/1983 | Chambers et al. |
| 4,443,952 A | 4/1984 | Schulien et al. |
| 4,464,117 A | 8/1984 | Foerst |
| 4,484,191 A | 11/1984 | Vavra |
| 4,513,235 A | 4/1985 | Acklam et al. |
| 4,546,347 A | 10/1985 | Kirsch |
| 4,560,983 A | 12/1985 | Williams |
| 4,581,491 A | 4/1986 | Boothroyd |
| 4,599,070 A | 7/1986 | Hladky et al. |
| 4,637,264 A | 1/1987 | Takahashi et al. |
| 4,639,884 A | 1/1987 | Sagues |
| 4,678,908 A | 7/1987 | LaPlante |
| 4,680,466 A | 7/1987 | Kuwahara et al. |
| 4,692,726 A | 9/1987 | Green et al. |
| 4,692,756 A | 9/1987 | Clark |
| 4,695,266 A | 9/1987 | Hui |
| 4,699,043 A | 10/1987 | Violante De Dionigi |
| 4,708,656 A | 11/1987 | De Vries et al. |
| 4,712,101 A | 12/1987 | Culver |
| 4,713,007 A | 12/1987 | Alban |
| 4,724,715 A | 2/1988 | Culver |
| 4,728,954 A | 3/1988 | Phelan et al. |
| 4,734,685 A | 3/1988 | Watanabe |
| 4,776,701 A | 10/1988 | Pettigrew |
| 4,794,384 A | 12/1988 | Jackson |
| 4,794,392 A | 12/1988 | Selinko |
| 4,795,296 A | 1/1989 | Jau |
| 4,795,901 A | 1/1989 | Kitazawa |
| 4,799,055 A | 1/1989 | Nestler et al. |
| 4,803,413 A | 2/1989 | Kendig et al. |
| 4,811,608 A | 3/1989 | Hilton |
| 4,815,006 A | 3/1989 | Andersson et al. |
| 4,819,195 A | 4/1989 | Bell et al. |
| 4,823,106 A | 4/1989 | Lovell |
| 4,823,634 A | 4/1989 | Culver |
| 4,825,157 A | 4/1989 | Mikan |
| 4,840,634 A | 6/1989 | Muller et al. |
| 4,851,771 A | 7/1989 | Ikeda et al. |
| 4,860,051 A | 8/1989 | Taniguchi et al. |
| 4,868,549 A | 9/1989 | Affinito et al. |
| 4,891,764 A | 1/1990 | McIntosh |
| 4,891,889 A | 1/1990 | Tomelleri |
| 4,896,554 A | 1/1990 | Culver |
| 4,906,843 A | 3/1990 | Jones et al. |
| 4,914,976 A | 4/1990 | Wyllie |
| 4,930,770 A | 6/1990 | Baker |
| 4,934,694 A | 6/1990 | McIntosh |
| 4,935,725 A | 6/1990 | Turnau |
| 4,935,728 A | 6/1990 | Kley |
| 4,937,685 A | 6/1990 | Barker et al. |
| 4,940,234 A | 7/1990 | Ishida et al. |
| 4,962,448 A | 10/1990 | DeMaio et al. |
| 4,964,837 A | 10/1990 | Collier |
| 4,965,446 A | 10/1990 | Vyse |
| 4,982,504 A | 1/1991 | Soderberg et al. |
| 4,982,618 A | 1/1991 | Culver |
| 4,983,901 A | 1/1991 | Lehmer |
| 5,004,391 A | 4/1991 | Burdea |
| 5,006,703 A | 4/1991 | Shikunami et al. |
| 5,007,300 A | 4/1991 | Siva |
| 5,019,761 A | 5/1991 | Kraft |
| 5,022,384 A | 6/1991 | Freels et al. |
| 5,022,407 A | 6/1991 | Horch et al. |
| 5,024,626 A | 6/1991 | Robbins et al. |
| 5,035,242 A | 7/1991 | Franklin |
| 5,038,089 A | 8/1991 | Szakaly |
| 5,044,956 A | 9/1991 | Behensky et al. |
| 5,053,975 A | 10/1991 | Tsuchihashi et al. |
| 5,062,830 A | 11/1991 | Dunlap |
| 5,065,145 A | 11/1991 | Purcell |
| 5,068,529 A | 11/1991 | Ohno et al. |
| 5,078,152 A | 1/1992 | Bond |
| 5,079,845 A | 1/1992 | Childers |
| 5,086,197 A | 2/1992 | Liou |
| 5,086,296 A | 2/1992 | Clark |
| 5,095,303 A | 3/1992 | Clark et al. |
| 5,107,080 A | 4/1992 | Rosen |
| 5,113,179 A | 5/1992 | Scott-Jackson et al. |
| 5,116,051 A | 5/1992 | Moncrief et al. |
| 5,125,261 A | 6/1992 | Powley |
| 5,132,927 A | 7/1992 | Lenoski et al. |
| 5,138,154 A | 8/1992 | Hotelling |
| 5,139,261 A | 8/1992 | Openiano |
| 5,142,931 A | 9/1992 | Menahem |
| 5,146,566 A | 9/1992 | Hollis, Jr. et al. |
| 5,148,377 A | 9/1992 | McDonald |
| 5,155,423 A | 10/1992 | Karlen et al. |
| 5,165,897 A | 11/1992 | Johnson |
| 5,168,268 A | 12/1992 | Levy |
| 5,175,459 A | 12/1992 | Daniel et al. |
| 5,182,557 A | 1/1993 | Lang |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,193,963 A | 3/1993 | McAffee et al. |
| 5,195,179 A | 3/1993 | Tokunaga |
| 5,195,920 A | 3/1993 | Collier |
| 5,202,961 A | 4/1993 | Mills et al. |
| 5,204,600 A | 4/1993 | Kahkoska |
| 5,209,131 A | 5/1993 | Baxter |
| 5,212,473 A | 5/1993 | Louis |
| 5,216,337 A | 6/1993 | Orton et al. |
| 5,220,260 A | 6/1993 | Schuler |
| 5,223,658 A | 6/1993 | Suzuki |
| 5,223,776 A | 6/1993 | Radke et al. |
| 5,228,356 A | 7/1993 | Chuang |
| 5,229,836 A | 7/1993 | Nagano |
| 5,230,623 A | 7/1993 | Guthrie et al. |
| 5,235,868 A | 8/1993 | Culver |
| 5,239,249 A | 8/1993 | Ono |
| 5,240,417 A | 8/1993 | Smithson et al. |
| 5,246,316 A | 9/1993 | Smith |
| 5,247,648 A | 9/1993 | Watkins et al. |
| 5,254,919 A | 10/1993 | Bridges et al. |
| 5,271,290 A | 12/1993 | Fischer |
| 5,275,174 A | 1/1994 | Cook |
| 5,275,565 A | 1/1994 | Moncrief |
| 5,280,276 A | 1/1994 | Kwok |
| 5,283,970 A | 2/1994 | Aigner |
| 5,284,330 A | 2/1994 | Carlson et al. |

| | | | | | | |
|---|---|---|---|---|---|---|
| 5,289,273 A | 2/1994 | Lang | | 5,635,897 A | 6/1997 | Kuo |
| 5,293,158 A | 3/1994 | Soma | | 5,638,421 A | 6/1997 | Serrano et al. |
| 5,296,846 A | 3/1994 | Ledley | | 5,642,469 A | 6/1997 | Hannaford et al. |
| 5,296,871 A | 3/1994 | Paley | | 5,643,087 A | 7/1997 | Marcus et al. |
| 5,299,810 A | 4/1994 | Pierce | | 5,652,603 A | 7/1997 | Abrams |
| 5,309,140 A | 5/1994 | Everett | | 5,666,138 A | 9/1997 | Culver |
| 5,313,229 A | 5/1994 | Gilligan et al. | | 5,680,141 A | 10/1997 | Didomenico et al. |
| 5,313,230 A | 5/1994 | Venolia et al. | | 5,691,747 A | 11/1997 | Amano |
| 5,317,336 A | 5/1994 | Hall | | 5,691,898 A | 11/1997 | Rosenberg et al. |
| 5,329,289 A | 7/1994 | Sakamoto et al. | | 5,694,153 A | 12/1997 | Aoyagi et al. |
| 5,334,027 A | 8/1994 | Wherlock | | 5,709,219 A | 1/1998 | Chen et al. |
| 5,341,459 A | 8/1994 | Backes | | 5,712,725 A | 1/1998 | Faltermeier et al. |
| 5,351,692 A | 10/1994 | Dow et al. | | 5,722,071 A | 2/1998 | Berg et al. |
| 5,359,193 A | 10/1994 | Nyui et al. | | 5,724,106 A | 3/1998 | Autry et al. |
| 5,374,942 A | 12/1994 | Gilligan et al. | | 5,724,264 A | 3/1998 | Rosenberg et al. |
| 5,379,663 A | 1/1995 | Hara | | 5,734,108 A | 3/1998 | Walker et al. |
| 5,381,080 A | 1/1995 | Schnell et al. | | 5,734,373 A | 3/1998 | Rosenberg et al. |
| 5,384,460 A | 1/1995 | Tseng | | 5,740,083 A | 4/1998 | Anderson et al. |
| 5,390,128 A | 2/1995 | Ryan et al. | | 5,742,278 A | 4/1998 | Chen et al. |
| 5,390,296 A | 2/1995 | Crandall et al. | | 5,745,057 A | 4/1998 | Sasaki et al. |
| 5,396,267 A | 3/1995 | Bouton | | 5,749,577 A | 5/1998 | Couch et al. |
| 5,397,323 A | 3/1995 | Taylor et al. | | 5,754,023 A | 5/1998 | Roston et al. |
| 5,398,044 A | 3/1995 | Hill | | 5,755,577 A | 5/1998 | Gillio |
| 5,402,499 A | 3/1995 | Robison et al. | | 5,755,620 A | 5/1998 | Yamamoto et al. |
| 5,402,582 A | 4/1995 | Raab | | 5,760,764 A | 6/1998 | Martinelli |
| 5,402,680 A | 4/1995 | Korenaga | | 5,763,874 A | 6/1998 | Luciano et al. |
| 5,405,152 A | 4/1995 | Katanics et al. | | 5,766,016 A | 6/1998 | Sinclair |
| 5,414,337 A | 5/1995 | Schuler | | 5,767,836 A | 6/1998 | Scheffer et al. |
| 5,417,696 A | 5/1995 | Kashuba et al. | | 5,767,839 A | 6/1998 | Rosenberg |
| 5,428,748 A | 6/1995 | Davidson et al. | | 5,769,640 A | 6/1998 | Jacobus et al. |
| 5,436,542 A | 7/1995 | Petelin et al. | | 5,771,037 A | 6/1998 | Jackson |
| 5,436,622 A | 7/1995 | Gutman et al. | | 5,781,172 A | 7/1998 | Engel et al. |
| 5,436,640 A | 7/1995 | Reeves | | 5,784,052 A | 7/1998 | Keyson |
| 5,437,607 A | 8/1995 | Taylor | | 5,785,630 A | 7/1998 | Bobick et al. |
| 5,450,079 A | 9/1995 | Dunaway | | 5,790,108 A | 8/1998 | Salcudean et al. |
| 5,452,615 A | 9/1995 | Hilton | | 5,795,228 A | 8/1998 | Trumbull et al. |
| 5,457,479 A | 10/1995 | Cheng | | 5,808,568 A | 9/1998 | Wu |
| 5,457,793 A | 10/1995 | Elko et al. | | 5,808,603 A | 9/1998 | Chen |
| 5,466,213 A | 11/1995 | Hogan | | 5,818,426 A | 10/1998 | Tierney et al. |
| 5,467,763 A | 11/1995 | McMahon et al. | | 5,821,921 A | 10/1998 | Osborn et al. |
| 5,473,344 A | 12/1995 | Bacon et al. | | 5,825,305 A | 10/1998 | Biferno |
| 5,474,082 A | 12/1995 | Junker | | 5,825,308 A | 10/1998 | Rosenberg |
| 5,481,914 A | 1/1996 | Ward | | 5,828,295 A | 10/1998 | Mittel et al. |
| 5,491,477 A | 2/1996 | Clark et al. | | 5,831,593 A | 11/1998 | Rutledge |
| 5,506,605 A | 4/1996 | Paley | | 5,841,133 A | 11/1998 | Omi |
| 5,512,919 A | 4/1996 | Araki | | 5,841,423 A | 11/1998 | Carroll, Jr. et al. |
| 5,514,150 A | 5/1996 | Rostoker | | 5,841,428 A | 11/1998 | Jaeger et al. |
| 5,524,195 A | 6/1996 | Clanton, III et al. | | 5,844,673 A | 12/1998 | Ivers |
| 5,526,022 A | 6/1996 | Donahue et al. | | 5,877,748 A | 3/1999 | Redlich |
| 5,530,455 A | 6/1996 | Gillick et al. | | 5,879,327 A | 3/1999 | Moreau DeFarges et al. |
| 5,542,672 A | 8/1996 | Meredith | | 5,889,506 A | 3/1999 | Lopresti et al. |
| 5,543,821 A | 8/1996 | Marchis et al. | | 5,889,670 A | 3/1999 | Schuler et al. |
| 5,547,382 A | 8/1996 | Yamasaki | | 5,897,437 A | 4/1999 | Nishiumi et al. |
| 5,547,383 A | 8/1996 | Yamaguchi | | 5,912,661 A | 6/1999 | Siddiqui |
| 5,550,562 A | 8/1996 | Aoki et al. | | 5,914,705 A | 6/1999 | Johnson et al. |
| 5,550,563 A | 8/1996 | Matheny et al. | | 5,917,486 A | 6/1999 | Rylander |
| 5,570,111 A | 10/1996 | Barrett et al. | | 5,919,159 A | 7/1999 | Lilley et al. |
| 5,575,761 A | 11/1996 | Hajianpour | | 5,936,613 A | 8/1999 | Jaeger et al. |
| 5,576,727 A | 11/1996 | Rosenberg et al. | | 5,954,689 A | 9/1999 | Poulsen |
| 5,583,407 A | 12/1996 | Yamaguchi | | 5,956,016 A | 9/1999 | Kuenzner et al. |
| 5,587,937 A | 12/1996 | Massie et al. | | 5,963,196 A | 10/1999 | Nishiumi et al. |
| 5,589,828 A | 12/1996 | Armstrong | | 5,986,638 A | 11/1999 | Cheng |
| 5,591,082 A | 1/1997 | Jensen et al. | | 5,990,869 A | 11/1999 | Kubica et al. |
| 5,591,924 A | 1/1997 | Hilton | | 6,001,014 A | 12/1999 | Ogata et al. |
| 5,592,401 A | 1/1997 | Kramer | | 6,017,273 A | 1/2000 | Pelkey |
| 5,604,345 A | 2/1997 | Matsuura | | 6,031,222 A | 2/2000 | Carapelli |
| 5,611,731 A | 3/1997 | Bouton et al. | | 6,069,614 A | 5/2000 | Singhal |
| 5,623,582 A | 4/1997 | Rosenberg | | 6,078,311 A | 6/2000 | Pelkey |
| 5,623,642 A | 4/1997 | Katz et al. | | 6,078,876 A | 6/2000 | Rosenberg et al. |
| 5,627,531 A | 5/1997 | Posso et al. | | 6,088,017 A | 7/2000 | Tremblay et al. |
| 5,628,686 A | 5/1997 | Svancarek et al. | | 6,088,109 A | 7/2000 | Liu |
| 5,629,594 A | 5/1997 | Jacobs et al. | | 6,097,499 A | 8/2000 | Casey et al. |
| 5,631,669 A | 5/1997 | Stobbs et al. | | 6,097,964 A | 8/2000 | Nuovo et al. |

| | | | |
|---|---|---|---|
| 6,100,874 | A | 8/2000 | Schena et al. |
| 6,104,379 | A | 8/2000 | Petrich et al. |
| 6,107,992 | A | 8/2000 | Ishigaki |
| 6,111,577 | A | 8/2000 | Zilles et al. |
| 6,128,006 | A | 10/2000 | Rosenberg et al. |
| 6,160,489 | A | 12/2000 | Perry et al. |
| 6,166,723 | A | 12/2000 | Schena et al. |
| 6,183,364 | B1 | 2/2001 | Trovato |
| 6,184,862 | B1 | 2/2001 | Leiper |
| 6,192,432 | B1 | 2/2001 | Slivka et al. |
| 6,219,034 | B1 | 4/2001 | Elbing et al. |
| 6,241,574 | B1 | 6/2001 | Helbing |
| 6,256,011 | B1 | 7/2001 | Culver |
| 6,259,433 | B1 | 7/2001 | Meyers |
| 6,280,327 | B1 | 8/2001 | Leifer et al. |
| 6,281,883 | B1 | 8/2001 | Barker |
| 6,293,798 | B1 | 9/2001 | Boyle et al. |
| 6,295,608 | B1 | 9/2001 | Parkes et al. |
| 6,300,038 | B1 | 10/2001 | Shimazu et al. |
| 6,300,936 | B1 | 10/2001 | Braun et al. |
| 6,349,301 | B1 | 2/2002 | Mitchell et al. |
| 6,418,329 | B1 | 7/2002 | Furuya |
| 6,422,941 | B1 | 7/2002 | Thorner et al. |
| 6,546,390 | B1 | 4/2003 | Pollack et al. |
| 6,633,224 | B1 | 10/2003 | Hishida et al. |
| 6,760,751 | B1 | 7/2004 | Hachiya et al. |
| 2001/0018354 | A1 | 8/2001 | Pigni |
| 2001/0045978 | A1 | 11/2001 | McConnell et al. |
| 2002/0072674 | A1 | 6/2002 | Criton et al. |
| 2003/0043206 | A1 | 3/2003 | Duarte |
| 2003/0112269 | A1 | 6/2003 | Lentz et al. |
| 2004/0076444 | A1 | 4/2004 | Badovinac et al. |
| 2004/0193393 | A1 | 9/2004 | Keane |
| 2005/0187747 | A1 | 8/2005 | Paxson et al. |

FOREIGN PATENT DOCUMENTS

| | | |
|---|---|---|
| EP | 0 085 518 B1 | 8/1989 |
| EP | 0349086 | 1/1990 |
| EP | 0 470 257 A1 | 2/1992 |
| EP | 0 358 989 B1 | 7/1994 |
| EP | 0626634 | 11/1994 |
| EP | 0 875 819 B1 | 10/2002 |
| GB | 2 237 160 A | 4/1991 |
| GB | 2 347 199 A | 8/2000 |
| JP | 59-160229 | 9/1984 |
| JP | 01-003664 | 7/1990 |
| JP | 02-109714 | 1/1992 |
| JP | 04-007371 | 8/1993 |
| JP | 05-193862 | 1/1995 |
| WO | WO 96/16397 | 5/1996 |
| WO | WO 96/24398 | 8/1996 |
| WO | WO 96/32679 | 10/1996 |
| WO | WO 97/31333 | 8/1997 |
| WO | WO 00/03319 | 1/2000 |
| WO | WO 00/77689 A1 | 12/2000 |
| WO | WO 01/00630 A1 | 1/2001 |
| WO | WO 01/67297 A1 | 9/2001 |
| WO | WO 03/000319 A1 | 1/2003 |

OTHER PUBLICATIONS

Adelstein, B. et al., Design and Implementation of a Force Reflecting Manipulandum for Manual Control Research, DSC-vol. 42, Advances in Robotics, ASME 1992, pp. 1-12.

Akamatsu et al., Multimodal Mouse: A Mouse-Type Device with Tactile and Force Display, Presence, vol. 3, No. 1 pp. 73-80, 1994.

ATIP98.059: Virtual Reality (VR) Development at SERI (Korea), Asian Technology Information Program (ATIP) Jul. 20, 1998, pp. 1-9.

Aukstakalnis, S. et al., The Art and Science of Virtual Reality Silicon Mirage, 1992, Peachpit Press, Inc., Berkeley, CA, pp. 129-180.

Baigrie, S. et al., Electric Control Loading-A Low Cost, High Performance Alternative, Proceedings, Nov. 6-8, 1990, pp. 247-254.

Bejczy, A., Sensors, Controls, and Man-Machine Interface for Advanced Teleoperation, Science, vol. 208, No. 4450, 1980, pp. 1327-1335.

Bejczy, A. et al., Kinesthetic Coupling Between Operator and Remote Manipulator, International Computer Technology Conference, The American Society of Mechanical Engineers, San Francisco, CA, Aug. 12-15, 1980, pp. 1-9.

Bejczy, A. et al., A Laboratory Breadboard System for Dual-Arm Teleoperation, SOAR '89 Workshop, JSC, Houston, Jul. 25-27, 1989.

Bejczy, A. et al., Universal Computer Control System (UCCS) for Space Telerobots, Jet Propulsion Laboratory, California Institute of Technology, Pasadena, CA, pp. 317-324.

Bjork, S. et al., An Alternative to Scroll Bars on Small Screens, Play: Applied Research on Art and Technology, Viktoria Institute, Box 620, SE-405 30 Gothenburg, Sweden, pp. 1-2.

Bouguila, L. et al., Effect of Coupling Haptics and Stereopsis on Depth Perception in Virtual Environment, Precision and Intelligence Laboratory, Tokyo Institute of Technology, 4259 Nagatsuta cho Midori ku Yokohama shi 226-8503-Japan.

Brooks, T. et al., Hand Controllers for Teleoperation: A State-of-the-Art Technology Survey and Evaluation, 1985, NASA Jet Propulsion Laboratory, California Institute of Technology, Pasadena, CA.

Burdea, G. et al., Distributed Virtual Force Feedback, IEEE Workshop on "Force Display in Virtual Environments and its Application to Robotic Teleoperation," May 2, 1993, Atlanta, GA.

Calder, B. et al., Design of a Force-Feedback Touch-Inducing Actuator for Teleoperator Robot Control, Submitted to the Department of Mechanical Engineering and Electrical Engineering in partial Fulfillment of the requirements of the degree of Bachelors of Science in Mechanical Engineering and Bachelor of Science in Electrical Engineering at the Massachusetts Institute of Technology, May 1983.

Caldwell, D. et al., Enhanced Tactile Feedback (Tele-Taction) using a Multi-Functional Sensory System, Dept. of Electronic Eng., University of Salford, Salford, M5 4WT, UK, 1993.

Cyberman Technical Specification, Logitech Cyberman SWIFT Supplement, Revision 1.0, Apr. 5, 1994, pp. 1-29.

Eberhardt, S. et al., OMAR-A Haptic Display for Speech Perception by Deaf and Deaf-Blind Individuals, IEEE Virtual Reality Annual International Symposium, Sep. 18-22, 1993, Seattle Washington.

Eberhardt, S. et al., Inducing Dynamic Haptic Perception by the Hand: System Description and Some Results, Dynamic Systems and Control, 1994, vol. 1, presented at 1994 International Mechanical Engineering Congress and Exposition, Chicago Illinois, Nov. 6-11, 1994.

Fukumoto, M. et al., Active Click: Tactile Feedback for Touch Panels, NTT DoCoMo Multimedia Labs, Japan.

Gobel, M. et al., Tactile Feedback Applied to Computer Mice, International Journal of Human-Computer Interaction, vol. 7, No. 1, pp. 1-24, 1995.

Gotow, J. et al., Controlled Impedance Test Apparatus for Studying Human Interpretation of Kinesthetic Feedback, The Robotics Institute and Deptartmetn of Mechanical Engineering, Carnegie Mellon University, Pittsburgh, PA 15213, pp. 332-337.

Hansen, W., Enhancing Docuemtns with Embedded Programs: How Ness extends Insets in the Andrew Toolkit, 1990, Information Technology Center, Carnegie Mellon University, Pittsburgh, PA 15213.

Hasser, C. et al., Tactile Feedback with Adaptive Controller for a Force-Reflecting Haptic Display Part 1: Design, 1996, Armstrong Laboratory, Human Systems Center, Air Force Materiel Command, Wright-Patterson AFB OH 45433.

Hasser, C. et al., Tactile Feedback for a Force-Reflecting Haptic Display, Thesis Submitted to the School of Engineering of the University of Daytona, Dayton OH, Dec. 1995.

Hasser, C., Force-Reflecting Anthropomorphic Hand Masters, Crew Systems Directorate Biodynamics and Biocommunications Division, Wright-Patterson AFB OH 45433-7901, Jul. 1995, Interim Report for the Period Jun. 1991-Jul. 1995.

Hinckley, K. et al., Haptic Issues for Virtual Manipulation, A Dissertation presented to the Faculty of the School of Engineering and Applied Science at the University of Virginia, in Partial Fulfillment of the Requirement for the Degree Doctor of Philosophy (Computer Science), Dec. 1996.

Howe, R., A Force-Reflecting Teleoperated Hand System for the Study of Tactile Sensing in Precision Manipulation, Proceedings of the 1992 IEEE Conference in Robotics and Automation, Nice, France-May 1992.

Iwata, H., Pen-Based Haptic Virtual Environment, Institute of Engineering Mechanics, University of Tsukuba, Japan, 1993.

Jacobsen, S. et al., High Performance, Dextrous Telerobotic Manipulator with Force Reflection, Intervention/ROV '91, Conference & Exposition, May 21-23, 1991, Hollywood, FL.

Johnson, A., Shape-Memory Alloy Tactical Feedback Actuator, Phase I-Final Report, Air Force SABIR Contract F33-88-C-0541, Armstrong Aerospace Medical Research Laboratory, Human Systems Division, Air Force Systems Command, Wright-Patterson Air Force Base, OH 45433.

Jones, L. et al., A Perceptual Analysis of Stiffness, Experimental Brain Research, 1990, vol. 79, pp. 150-156.

Kaczmarek, K. et al., Tactile Displays, Virtual Environment Technologies, pp. 349-414.

Kelley, A. et al., MagicMouse: Tactile and Kinesthetic Feedback in the Human-Computer Interface using an Electromagnetically Actuated Input/Output Device, Department of Electrical Engineering, University of British Columbia, Canada, Oct. 19, 1993.

Lake, S.L., Cyberman from Logitech, web site at http://www.ibiblio.org/GameBytes/issue21/greviews/cyberman/html, as available via the Internet and printed May 29, 2002.

MaClean, K., Designing with Haptic Feedback, Interval Research Corporation, 1801 Page Mill Road, Palo Alto, CA 94304, 2000.

Mine, M., Isaac: A Virtual Environment Tool for the Interactive Construction of Virtual Worlds, Department of Computer Science, University of North Carolina Chapel Hill, 1995.

Picinbono, G. et al., Extrapolation: A Solution for Force Feedback, Virtual Reality and Prototyping, Jun. 1999, Laval, France.

Wloka, M., Interacting with Virtual Reality, Science and Technology Center for Computer Graphics and Scientific Visualization, Brown University Site, Department of Computer Science, 1995.

eRENA, Pushing Mixed Reality Boundaries, Deliverable 7b.1, Final, Version 1.0.

Real Time Graphics, The Newsletter of Virtual Environment Technologies and Markets, Aug. 1998, vol. 7, No. 2.

1998 IEEE International Conference on Robotics and Automation, May 16-20, 1998, Lueven, Belgium.

Batter, J.J. et al., "Grope-1: A Computer Display to the Sense of Feel," Proc. IFIP Congress 1971, pp. 759-763.

Bejczy, "Generalization of Bilateral Force-Reflecting Control of Manipulators," Proceedings of Fourth CISM-IFtoMM, Sep. 8-12, 1981.

Bliss, "Optical-to-Tactile Image Conversion for the Blind," IEEE Transactions on Man-Machine Systems, vol. MMS-11, No. 1, Mar. 1970.

Ellis, R.E. et al., "Design and Evaluation of a High-Performance Prototype Planar Haptic Interface," DSC-vol. 49, Advances in Robotics, Mechatronics, and Haptic Interfaces, ASME 1993.

Howe, R. et al., "Task Performance with a Dextrous Teleoperated Hand System," Proc. of SPIE, vol. 1833, Nov. 1992.

IBM Technical Disclosure Bulletin, "Mouse Ball-Actuating Device with Force and Tactile Feedback," vol. 32, No. 9B, Feb. 1990.

Iwata, H., "Artificial Reality with Force-Feedback: Development of Desktop Virtual Space with Compact Master Manipulator," Computer Graphics, vol. 24, No. 4, Aug. 1990.

Johnson, "Shape-Memory Alloy Tactile Feedback Actuator," Armstrong Aerospace Medical Research Laboratory, AAMRL-TR-90-039, Aug. 1990.

Kontarnis et al., "Display of High-Frequency Tactile Information to Teleoperators," Telemanipulator Technology and Space Telerobotics, Won S. Kim, Editor, Proc. SPIE Vol. 2057, pp. 40-50, Sep. 7-9, 1993.

Kontarnis et al., "Tactile Display of Vibratory Information in Teleoperation and Virtual Environments," Presence, vol. 4, No. 4, pp. 387-402, 1995.

Marcus, "Touch Feedback in Surgery," Proceedings of Virtual Reality and Medicine The Cutting Edge, Sep. 8-11, 1994.

McAffee, Teleoperator Subsystem/Telerobot Demonstrator: Force Reflecting Hand Controller Equipment Manual, JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Payette, J. et al., "Evaluation of a Force Feedback (Haptic) Computer Pointing Device in Zero Gravity," DSC-vol. 58, Proc. of ASME Dynamics Systems and Control Div., ASME 1996.

Rabonowitz et al., "Multidimensional tactile displays: Identification of vibratory intensity, frequency, and contactor area," Journal of the Acoustical Society of America, vol. 82, No. 4, Oct. 1987.

Ramstein, C., "Combining Haptic and Braille Technologies: Design Issues and Pilot Study," ASSETS '96, 2.sup.nd Annual ACM Conf. on Assistive Technologies Apr. 1996.

Russo, "The Design and Implementation of a Three Degree-of-Freedom Force Output Joystick," Dept. of Mech. Eng., May 1990.

Russo, "Controlling Dissipative Magnetic Particle Brakes in Force Reflective Devices," DSC-vol. 42, Advances in Robotics, pp. 63-70, ASME 1992.

Schmult, B. et al., "Application Areas for a Force-Feedback Joystick," DSC-vol. 49, Advances in Robotics, Mechatronics, and Haptic Interfaces, ASME 1993.

Schimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851: JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, Control System Design for a Three Degree of Freedom Virtual Environment Simulator Using Motor/Brake Pair Actuators, MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

Wiker, "Teletouch Display Development: Phase 1 Report," Technical Report 1230, Naval Ocean Systems Center, San Diego, Apr. 17, 1989.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Pimentel et al., "Virtual Reality: through the new looking glass," $2^{nd}$ Edition; McGraw-Hill, ISBN 0-07-050167-X, pp. 41-202, 1994.

Scannell, "Taking a Joystick Ride," Computer Currents, Boston Edition, vol. 9, No. 11, Nov. 1994.

United States Patent and Trademark Office, Office Action, U.S. Appl. No. 09/393,998, mailed Mar. 30, 2001.

United States Patent and Trademark Office, Office Action, U.S. Appl. No. 09/393,998, mailed Apr. 17, 2003.

United States Patent and Trademark Office, Office Action, U.S. Appl. No. 09/393,998, mailed Sep. 8, 2005.

United States Patent and Trademark Office, Office Action, U.S. Appl. No. 09/393,998, mailed Jan. 24, 2007.

United States Patent and Trademark Office, Office Action, U.S. Appl. No. 09/393,998, mailed Jun. 21, 2007.

United States Patent and Trademark Office, Office Action, U.S. Appl. No. 09/393,998, mailed Jul. 6, 2009.

United States Patent and Trademark Office, Office Action, U.S. Appl. No. 09/393,998, mailed Nov. 14, 2007.

United States Patent and Trademark Office, Office Action, U.S. Appl. No. 09/393,998, mailed May 12, 2010.

TACTILE FEEDBACK INTERFACE DEVICE INCLUDING DISPLAY SCREEN

CROSS-REFERENCES TO RELATED APPLICATION

This application is a continuation of U.S. patent application Ser. No. 09/875,458 entitled "Tactile Feedback Interface Device Including Display System" filed Jun. 5, 2001, now U.S. Pat. No. 7,151,527, which is a continuation of U.S. patent application Ser. No. 09/203,908 entitled "Multi-Function Control Device With Force Feedback" filed Dec. 1, 1998, now U.S. Pat. No. 6,256,011, which claims priority to U.S. Provisional Patent Application No. 60/067,381 entitled "Interactive Panels for Instrument Control" filed Dec. 3, 1997, and U.S. Provisional Patent Application No. 60/067,382 entitled "An Improved Multi-Function Control with Feedback" filed Dec. 3, 1997, the entirety of each of which is hereby incorporated by reference.

FIELD OF THE INVENTION

This invention relates generally to control devices, and more particularly to force feedback control devices.

BACKGROUND

Control devices can be used for a variety of different control tasks. A user can conveniently select or operate different functions and features of a device using the control device. In some cases, the control device allows a user to operate or interface with a device remotely, without having to operate controls located on the housing of the device itself. For example, signals can be sent from the remote control device to the controlled apparatus. In addition, the control device preferably offers a more intuitive and easy-to-use way of interfacing with a device than using other inconvenient, bulky, or unintuitive controls.

Control devices can be implemented in a variety of forms. In hand-held embodiments, it is desirable for control devices to be lightweight and convenient to hold, and to include controls that are straightforward to use, comfortable, and effective in controlling the features or operation of a device. Typical control devices of the prior art, however, may not include all these features. For example, a standard joystick device may not be very convenient for use in controlling functions since it either requires two hands to operated (one hand holding the device, the other hand operating the joystick), or it requires a table top or other surface on which to rest the joystick. Some attempts have been made to develop one-handed joysticks, but these devices often end up clumsy and ineffective. Similarly, gamepad controllers, commonly used to interface with video games provided by game consoles, require the use of two hands and are thus inconvenient in many applications.

In embodiments where a device is not hand-held, there is still a need for a controller device having superior precision, ergonomics, and convenience. Furthermore, such a device that can readily include force feedback functionality is also desirable.

SUMMARY

The present invention provides a control device that allows a user to interface with an apparatus in a convenient and effective manner. The control device can also be provided with force feedback for added functionality and efficiency.

More particularly, a control device of the present invention includes a housing and a carrier coupled to the housing and operative to move with respect to the housing in a first rotary degree of freedom. A first sensor senses the movement of the carrier and outputs a first control signal. A roller rotatably coupled to the carrier rotates with the carrier in the first degree of freedom and rotates independently of the carrier in a second rotary degree of freedom. A second sensor senses rotary motion of the roller and outputs a second control signal. Preferably, an arm member is coupled between the carrier and the housing, where the am member pivots about an axis and where the first sensor senses rotation of the arm member. The roller rotates about an axis that is parallel to a plane of rotation of the arm member. The arm member can be positioned in the housing, where the housing includes an aperture through which the carrier and roller are accessible to a user of the control device. Preferably, a third sensor is also included to detect when the carrier has been pushed in a direction substantially orthogonal to a plane of rotation of the arm member.

In another embodiment, force feedback functionality is preferably included in the control device. For example, a first actuator is preferably coupled to the arm and outputs a force on the arm in its degree of freedom. A second actuator can be coupled to the roller to output a force to the roller in its rotary degree of freedom. The first and second actuators are controlled by first and second actuator signals. The control device interfaces with an apparatus; the apparatus, for example, can be a host computer that provides force feedback signals to the control device based at least in part on the first and second sensor signals received from the control device. For example, the host computer can display a graphical environment, such as graphical user interface or game environment, in which a user-controlled graphical object is displayed, such as a cursor, having a position determined by the first and second sensor signals. Other graphical objects may also be displayed. In one embodiment, the first and second force feedback signals are determined at least in part based on an interaction of the cursor with a displayed graphical object.

A number of alternate embodiments of the control device are also provided. A second roller can be coupled to the carrier and rotate with respect to the carrier independently of the first roller. Another sensor is provided to sense rotary motion of the second roller. The second roller can be oriented in the same direction as the first roller, or can be oriented orthogonally or in other configurations. Furthermore, a belt can be coupled between the first and second rollers which is accessible to be contacted and moved by the user. A rotating member, such as a cylinder or sphere, can be coupled to the housing and extend from a bottom plate of the housing, such that the rotating member contacts a flat surface and rotates when the control device is moved over the flat surface. The carrier can alternatively be coupled to the housing by contact bearings which sit in tracks on the housing and allow the carrier to move along the tracks.

The device and method of the present invention provide an interface to an apparatus that provides greater control functionality and convenience for the user. The arcuate or linearly moving carrier portion is easily moved by a user'thumb, providing horizontal control over a cursor or other input. The rotatable wheel provided in the carrier allows the same finger of the user to control vertical motion of a cursor or control a different function of an apparatus. However, since the wheel rotates in a single position, the length of the carrier arm need not be adjusted greatly for differently-sized hands. Force feedback may also be added to the control device to provide the user with greater control and to inform the user of options and selections through the sense of touch.

These and other advantages of the present invention will become apparent to those skilled in the art upon a reading of the following specification of the invention and a study of the several figures of the drawing.

BRIEF DESCRIPTION OF THE DRAWINGS

FIG. 2 is a side elevational view of the control device of FIG. 1a;

FIGS. 4a and 4b are top plan and side elevational views, respectively, of an alternate grip for the control device of FIG. 1a;

FIGS. 13a and 13b are top plan and side elevational views, respectively, of an alternate table-top embodiment of the control device of FIG. 1a.

DETAILED DESCRIPTION

Figure 1A:
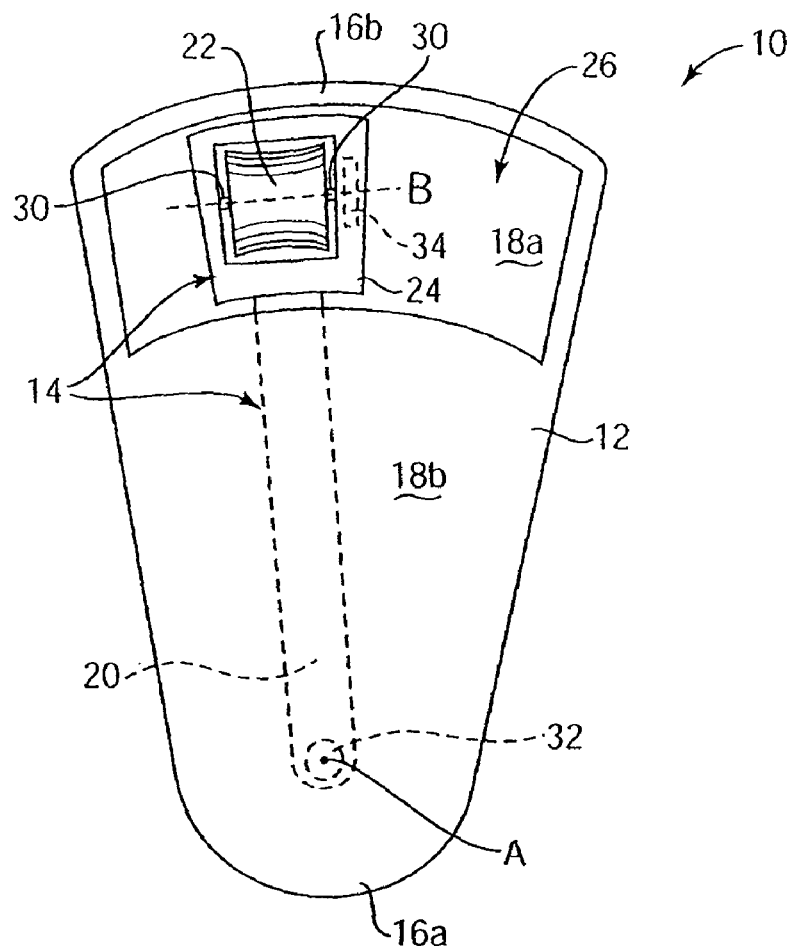
FIG. 1a is a top plan view of one embodiment of a control device of the present invention.

FIG. 1a is a top plan view of a first embodiment 10 of an interface control device of the present invention. Control device 10 includes a housing 12 and a moveable arm assembly 14. The housing 12 is intended to allow easy hand-held use of the control device. Thus, housing 12 is approximately of a size that will fit snugly in a user's hand and allow the user's thumb to reach the controlled portion of the arm assembly 14, as described in greater detail below. The edges of housing 12 are preferably rounded to allow comfortable use by the user. In other embodiments, the housing 12 need not be hand-held but can be used on a grounded surface (see FIGS. 13a and 13b) or can be part of a fixed panel, keyboard, computer or other device housing, or other apparatus. Housing 12 includes a first end 16a and a second end 16b, where the second end 16b is held away from the user and toward an apparatus interfaced with the device 10, if appropriate. Housing 12 preferably has a bottom plate 18a and a top plate 18b, which are spaced apart by sidewalls (not shown) of the housing 12 to define a space between the plates 18a and 18b.

Arm assembly 14 is rotatably coupled to the housing 12 between the bottom plate 18a and top plate 18b. Assembly 14 includes an arm member 20 and a cylindrical roller 22. Arm member 20 is coupled to bottom plate 18a and/or top plate 18b at a first end and may pivot about an axis A. A carrier portion 24 is coupled to the arm member 20 and is exposed to the user through an opening 26 in the top plate 18b. The carrier portion can be made as part of the arm member 20 or as a separate piece coupled to the arm member. Carrier portion 24 preferably has an opening 28 in its center which holds cylindrical roller 22. For example, the roller 22 can be coupled to the carrier portion 24 by an axle 30 which allows the roller 22 to rotate about an axis B.

The roller 22 is preferably cylindrical and may include textures or other surface features to assist the user in creating frictional contact with the user's finger to turn the roller. For example, bumps, ridges, or other surface features can be provided, and/or a frictional material such as rubber can be included on the surface of the roller. In other embodiments, rollers of other cross-sectional shapes can be used, such as octagonal, hexagonal, etc.

A first sensor 32 is coupled to the arm member 20 near axis A to measure the rotation of the arm assembly about axis A. The sensor 32 can be a digital optical encoder, analog potentiometer, magnetic sensor, optical sensor (e.g. photodiode or photoresistor), or other type of sensor than can detect rotary motion of the arm member 20 relative to the housing 12. The first sensor 32 outputs a first raw sensor signal indicative of the motion of the arm member, and can be a relative sensor or an absolute sensor. For example, if a relative sensor is used, the first sensor 32 can output a signal indicating the amount of rotation since the last detected position.

In one alternate embodiment, an optical sensor can be used as first sensor 32 and/or second sensor 34. In one type of optical encoder, optical fibers are used to conduct received light pulses to a set of photodetectors. Movement of a member over a striped pattern thus generates electrical motion signals. The moving elements of device 10 may be coupled to a pattern member such as a code wheel or linear element, where optical fibers are used for remote motion sensing. Optical fibers are well suited to the device 10 due to the flexibility of the fibers, allowing the fibers to be routed from a moving optical pickup point (in the swinging arm) to a fixed photodetector location, such as on a circuit board mounted to the housing 12 of the device 10. In such an embodiment, mechanically-driven sensors would not be required. Alternatively, optical channels molded in and integral with a support structure can be used with an optical encoder instead of optical fibers. Such optical channel encoders are described in greater detail in application Ser. No. 60/067,381, incorporated herein by reference.

A second sensor 34 is coupled to the axis 30 of the roller 22 to detect rotation of the cylindrical roller 22 about axis B. Sensor 34 can be grounded to the carrier portion 24 to as to measure rotation of the roller 22 with respect to the carrier portion. Similar to the first sensor 32, the second sensor 34 outputs a second raw sensor signal indicative of the rotation of the roller 22. The sensor 34 can be a digital sensor or analog sensor, and can be relative sensor or absolute sensor, similar to the first sensor 34.

Figure 1B:
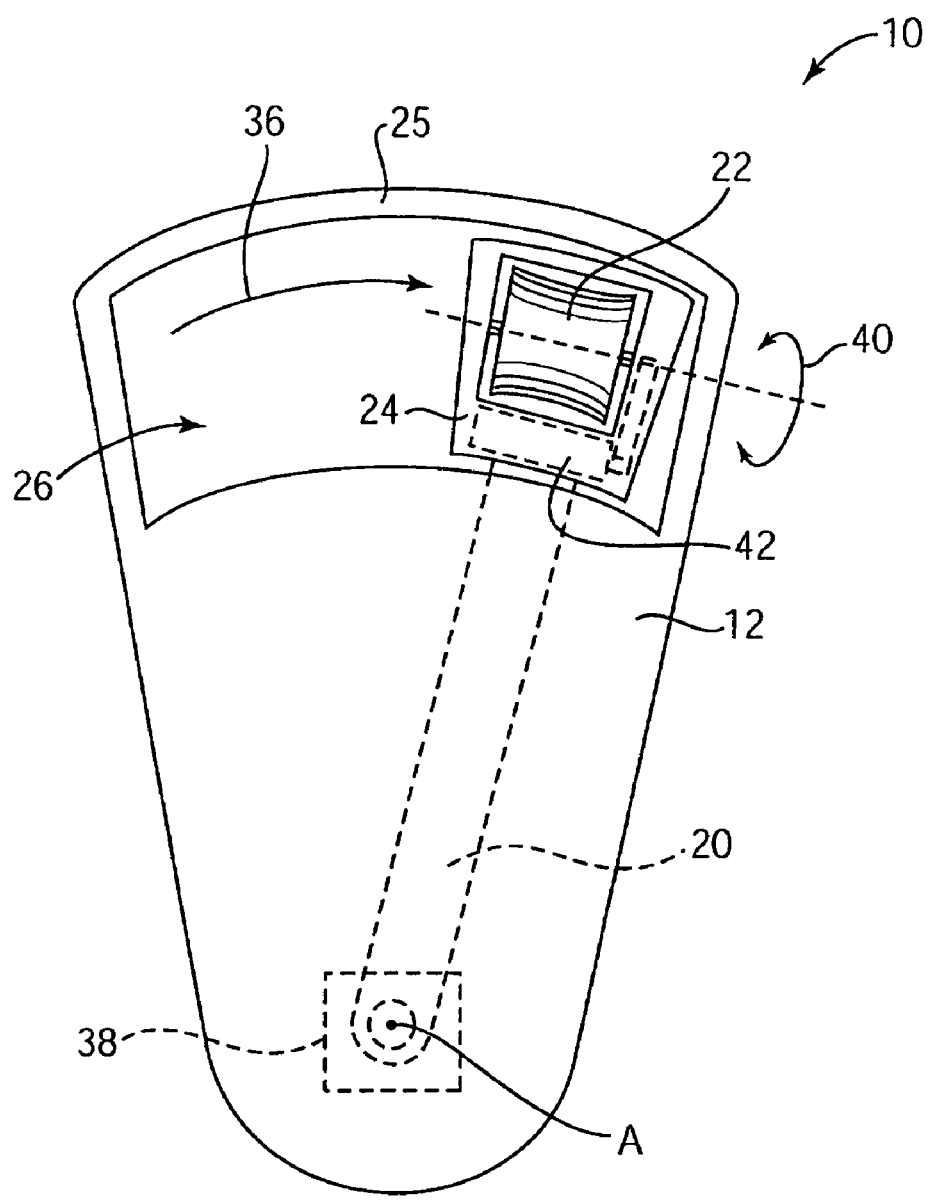
FIG. 1b is a top plan view of the control device of FIG. 1a also including actuators for force feedback.
Figure 11:
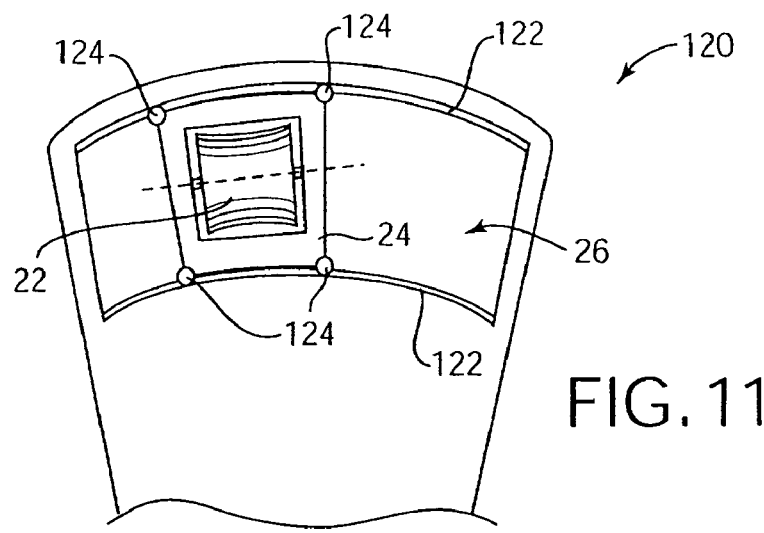
FIG. 11 is a partial top plan view of an alternate embodiment of the control device of the present invention including a carrier coupled to tracks by bearings.

Two axes of motion are preferably integrated in the control device 10. As shown in the top plan view of FIG. 1b, the arm assembly 14 can be moved by the user to provide input signals to the apparatus with which the user is interfacing. The user can contact the carrier portion 24 or the roller 22 with a finger and move the assembly left or right about the axis A using finger pressure. The carrier portion thus moves in a linear arcuate path. For example, in FIG. 1b, the user has moved the assembly 14 in a direction from left to right, as indicated by arrow 36. Preferably, stops are provided at both ends of the opening 26 to limit the motion of the arm assembly 14. In alternate embodiments, the opening 26 can be made linear, and the motion of the carrier portion 24 and roller 22 can be linear motion from one end to the other of the opening 26. In such an embodiment, roller bearings, sliding bearings, or other mechanisms can be used; for example, FIG. 11 shows an embodiment in which such movement can be provided.

The length of the arm member 20 can be varied in different embodiments to accommodate differently-sized fingers or hands; in some embodiments, an adjustable arm member 20 can be provided that allows a user to adjust arm length (a larger opening 26 can be used to accommodate different arm member lengths). However, it should be noted that the roller 22 does not change its position along the arm member 20 to provide an adjustable input signal. Thus, a single, convenient arm length for member 20 can be provided that allows the user's thumb to reach the roller for most hand sizes. The motion of the carrier in left and right directions can also typically be accommodated by most hand sizes.

In one preferred embodiment, this motion of arrow 36 controls the motion of a user-controlled graphical object, Such as a cursor displayed on a display screen, in a horizontal linear degree of freedom, i.e. along an X-axis. Although the movement of arm assembly 14 is rotational about axis A, the arm member 20 is sufficiently long to allow the user to perceive the motion of the assembly to be almost linear, thus allowing easy mapping of the assembly motion to linear horizontal cursor motion. The motion of the assembly 14 is preferably mapped to cursor position according to a position control mapping, so that the position of the assembly 14 in its degree of freedom directly corresponds to a position of the cursor in the displayed degree of freedom. Thus, motion of the cursor to the left would stop at the left edge of the screen precisely when the assembly 14 reached a left limit to its degree of freedom, and a similar relationship is provided at the right edge of the screen and the right limit to the assembly 14. Alternatively, a rate control mapping can be provided between assembly 14 and the controlled graphical object. The rate control mapping is best provided when force feedback is implemented, as described below.

In one preferred embodiment, the control of a graphical object such as a cursor by the control device 10 is provided in a graphical user interface (GUI) displayed by a host computer. The GUI includes several different objects, such as icons, pull down menus and menu items, windows, scroll bars, graphical buttons, sliders, links (in a web page) etc. The cursor can be controlled to manipulate and/or select these various graphical objects with the control device 10 of the present invention. In other embodiments, the motion of assembly 14 as shown by arrow 36 can control other motions of a cursor or other controlled graphical object, such as rotation or turning of a simulated vehicle controlled by the user. In yet other embodiments, this motion can control other functions or motions, such as the changing of a volume for a stereo, the rotation of an apparatus set on a grounded pedestal, or the velocity of a controlled vehicle. A variety of electronic or computer apparatuses can be controlled by the device 10. For example, the controlled apparatus can be a home appliance such as a television set, a microwave oven or other kitchen appliances, a washer or dryer, an audio home stereo component or system, a home computer, a set top box or web browser appliance for a television, a video game console, a home automation system (to control such devices as lights, garage doors, locks, appliances, etc.), a telephone, photocopier, model vehicle, toy, a video or film editing or playback system, etc. Device 10 can be physically coupled to the apparatus, or the panel 12 can be physically remote from the device 10 and communicate with the device using signals transferred through wires, cables, wireless transmitter/receiver, etc.

In one embodiment, force feedback is provided in the degree of freedom of assembly 14 using actuators. For example, an actuator 38 can be grounded to the housing 12 and can output forces on the arm member 20 in the rotary degree of freedom about axis A. Actuator 38 can be an active actuator that outputs forces in the degree of freedom and can move the assembly 14 if conditions allow; active actuators include a DC motor, voice coil actuator, moving magnet actuator, hydraulic or pneumatic actuator, torquer, etc. Alternatively, actuator 38 can be a passive actuator that does not output active forces in the degree of freedom but provides resistance to motion when so controlled, such as magnetic particle brakes, hydraulic or pneumatic passive brakes, friction members, friction drive, electromagnetic coil wound about an ferrous core, etc.

The use of force feedback in the degree of freedom of the arm assembly 14 can provide a variety of functions and greater ease of use for the user. For example, jolt forces or bumps can be output on the arm assembly 14 when the controlled cursor moves over a particular object, such as an icon or window border. Or, attractive forces can assist the user in moving the cursor onto a target such as an icon, menu item, or link in a web page, and resist motion away from the target once the cursor has moved onto the target. Other forces include detents, spring forces, repulsive forces, textures, damping forces, vibrations or other periodic forces, or obstruction forces. Such functionality is described in greater detail in co-pending patent application Ser. No. 08/571,606, incorporated herein by reference. Furthermore, a rate control mapping between the assembly 14 and a controlled object or function can be provided, where the amount of movement away from an origin position indicates a magnitude of input. For example, the origin position of the assembly 14 can be designated to be at the center of the degree of freedom of the arm assembly 14. A spring force is output that resists motion of the arm assembly away from the origin position, where the greater the deviation from the origin, the greater the resistive force that biases the assembly back to the origin. The amount of deviation from the origin is directly to proportional to a magnitude of input. Thus, if the user is controlling the velocity of a cursor, the greater the assembly 14 is moved from the origin, the faster the cursor will move. The direction of the assembly from the origin controls the direction of the object or function. Functions such as motion, volume, velocity, or any parameter that can be changed can be controlled according to a rate control mapping. Furthermore, a rate control mapping and a position control mapping can both be used, as desired by the user and/or as selected by a host computer or other apparatus. Such dual functionality is described in greater detail in U.S. Pat. No. 5,825,308, incorporated herein by reference.

Motion of the cylindrical roller 22 about axis B, as shown by arrow 40, preferably provides a separate sensor signal and thus controls a separate function or motion of the controlled apparatus or object. The user preferably contacts the roller with a finger, such as the thumb, and rolls the roller in the desired direction. While resting on the roller 22, the user's finger can also contact the surface of the carrier portion 24, as well as the top edge 25 of the housing 12. This creates a frictional coupling between the finger and these three surfaces, which increases control stability. The roller 22 can be provided with a stop so that it rotates for a certain range, and then can no longer be rotated in that direction. Alternatively, the roller 22 can be provided with no stops so as to allow the roller to rotate freely in either direction with no limits.

The roller 22 can control a variety of functions or motion. For example, in one preferred embodiment, the rotation of roller 22 controls the position of a displayed graphical object, such as a cursor, in a vertical linear degree of freedom, i.e. along a Y-axis. In a position control mapping, the position of the roller 22 in its degree of freedom is directly correlated to a position of the cursor in the vertically displayed degree of freedom. Such an embodiment can include one or more stops for roller 22 so that when the roller reaches a limit, the cursor has correspondingly reached the top or bottom edge of the screen. A rate control mapping can also be provided, which is more suitable for the force feedback embodiment as described below. Alternatively, the motion of roller 22 can control other motions of a cursor or other controlled graphical object, such as rotation or turning of a simulated vehicle controlled by the user. In yet other embodiments, the roller motion can control other functions or motions, such as the changing of volume for a stereo, the rotation of an apparatus set on a grounded pedestal, or the velocity of a controlled vehicle.

In one embodiment, force feedback is provided in the degree of freedom of roller 22 using an actuator 42. For example, actuator 42 can be grounded to the carrier portion 24, coupled to the axle 30 of the roller 22 by a belt or other transmission, and output forces on the roller 22 in the rotary degree of freedom about axis B. Actuator 42 can be an active actuator that outputs forces in the degree of freedom, or a passive actuator that provides resistance to motion, as described above.

The force feedback on roller 22 can be used in similar ways as the forces applied to arm assembly 14, described above. For example, detents, jolts, spring forces, attractive or repulsive forces, textures, damping forces, vibrations or other periodic forces, or obstruction forces can be output on the roller. Furthermore, a rate control mapping is preferably implemented using spring forces as described above with reference to the arm assembly 14. For example, the roller 22 has a designated origin position, and a deviation of the roller from the origin, in opposition to the spring forces, causes a function or motion to be controlled based on the amount of deviation from the origin. Furthermore, other force sensations that can be output on roller 22 include forces that simulate ends of travel for the roller or inform the user that the end of travel has been reached. For example, as the user rotates the knob in one direction, the end of the adjusted value range is reached. If there is no hard stop on the roller at this position, the actuator can be controlled to output an obstruction force to prevent or hinder the user from rotating the roller further in that direction. Alternatively, a jolt force can be output that is stronger in magnitude than normal detents, which informs the user that the end of the adjusted range has been reached. Other force sensations that can be applied to a rotatable knob-like control, such as a roller 22, are described in co-pending patent application Ser. No. 09/179,382, by Levin et al., filed Oct. 26, 1998, entitled, "Control Knob with Multiple Degrees of Freedom and Force Feedback", assigned to the same assignee as the present invention, and which is incorporated herein by reference.

The actuators 38 and 42 are preferably controlled with driver signals from a microprocessor or other controller. A suitable control architecture is shown with respect to FIG. 14, below.

In some embodiments of the control device 10, the arm assembly 14 can be sensitive to inertial forces, which could cause undesired movement of the arm assembly in particular environments, such as in a moving vehicle. The sensitivity to inertia can be reduced or eliminated by coupling a counterweight to the arm assembly, For example, a pair of spur gears can be used, where one gear is coupled to the arm assembly, and the other gear is interlocked with the first gear and is coupled to a different arm member having a counterweight attached to its end. Both the arm assembly and the counterweight arm can be of approximately equal weight. The counterweight arm can be positioned underneath the arm assembly and can pivot in a plane substantially parallel to the plane of rotation of arm assembly 14. The counterweight moves in an opposite direction to the arm assembly, thereby cancelling inertial movement of the arm assembly.

Figure 2:
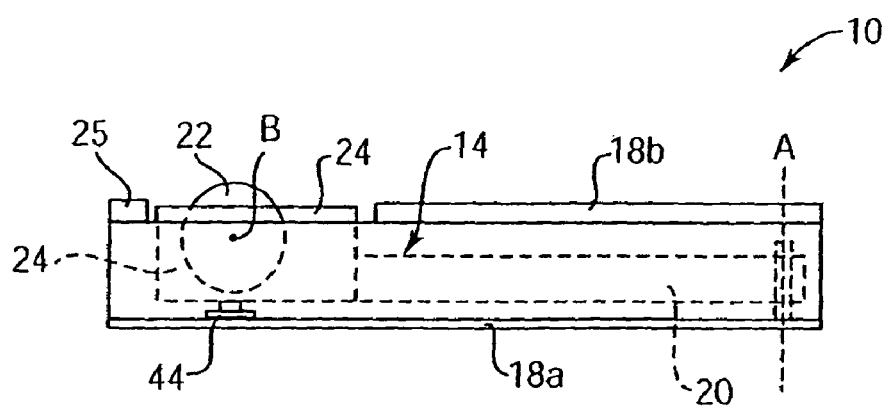

FIG. 2 is a side elevational view of the control device 10 shown in FIG. 1a. As shown, the arm assembly 14 preferably rotates a small distance above the bottom plate. A pressure switch 44 is provided under the carrier portion 24 of the arm assembly 14. When the user exerts downward finger pressure on the carrier portion 24 or the roller 22, the carrier portion 24 flexes down to engage and change the state of the switch.

Preferably, the engagement of the switch 44 is the equivalent of a "mouse click" in a standard mouse input device, or a trigger press in a gaming controller. Thus, when the user controls a cursor to acquire a target such as a graphical icon, the user can then push on the roller 22 or carrier portion 24 to engage switch 44 and select the icon or execute a program associated with the icon. Furthermore, the roller 22 can be moved while the carrier portion 24 is held in an engaged position with switch 44 to allow "dragging" of graphical objects such as windows and icons within the GUI. Switch 44 can be implemented as other types of switches in other embodiments, for example an optical switch (for example, as described in co-pending application Ser. No. 60/067,381), magnetic switch, or other type of switch.

Figure 3A:
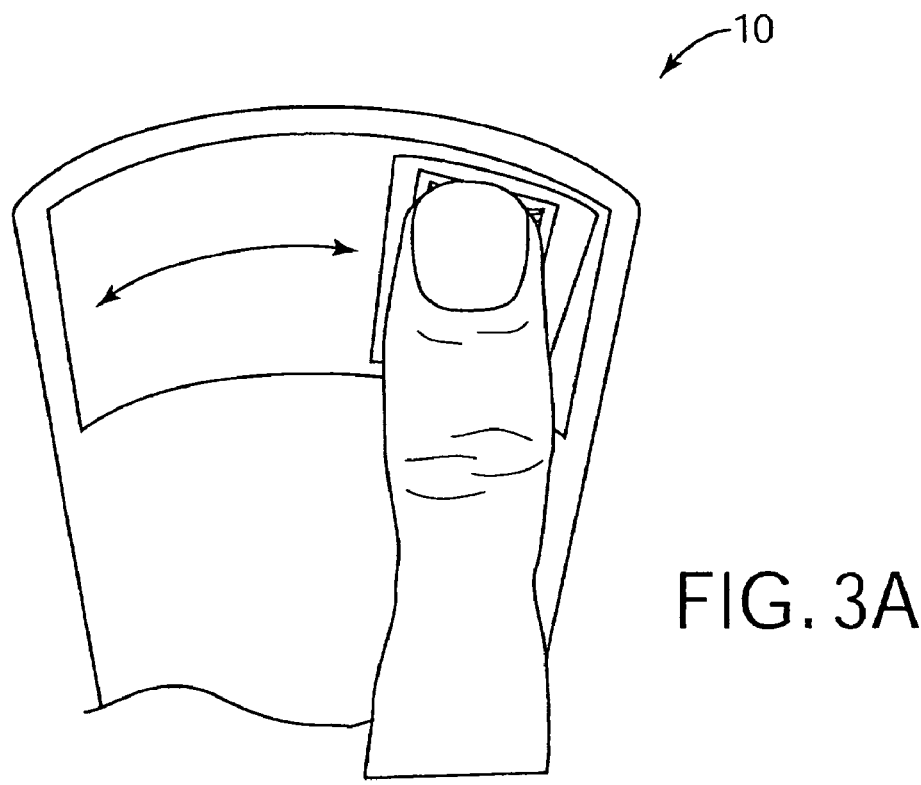
FIGS. 3a and 3b are top plan and side elevational views, respectively, of the control device of FIG. 1a being used by the thumb of a user.
Figure 3B:
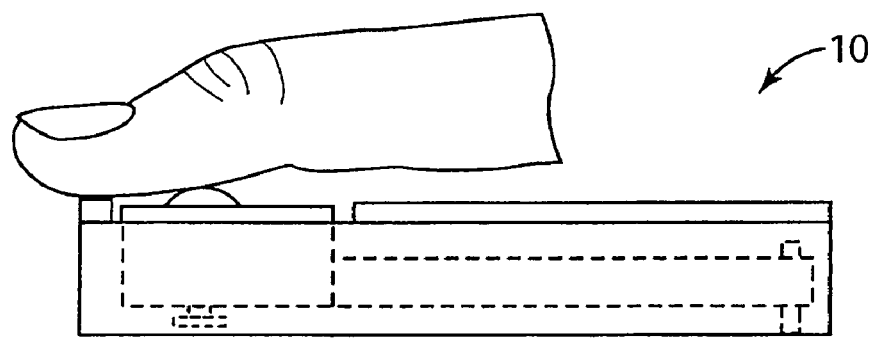

FIGS. 3a and 3b are top plan and side elevational views, respectively, of a user operating the control device 10 with a finger. The user preferably uses a thumb to rotate the cylinder 22 and move the arm assembly left and right to control the X- and Y-motion of a controlled graphical object, or adjust the values for other functions or movement. The fingers of the user are preferably wrapped around the side and end at the bottom surface of the device 10 to hold the device cradled in the hand. In alternate embodiments, the user can use the control device with two hands, where one hand moves the roller/arm and the other hand manipulates other controls on the device, e.g. buttons, switches, etc. provided on other areas of the housing 12. In yet other embodiments, a two handed control device 10 can be provided, where the user grasps an extension to the housing past the roller with one hand and manipulates the roller motion with the other hand.

Using the thumb to control positioning functions contributes to superior ergonomics in the control device 10 of the present invention. When a user traces his or her thumb across the tips of the other fingers, every joint in his or her hand moves in concert to facilitate the thumb' motion. The opposed position of a thumb relative to the other fingers is utilized by the control device 10 to achieve a comfortable and natural interface. Other advantages of a thumb control and a hand-held control device 10 are described in U.S. Pat. No. 5,666,138, assigned to assignee of the present application, and incorporated herein by reference. Other features in that patent can be applied to the present invention as well. In addition, a cylindrical control having linear motion is described in U.S. Pat. Nos. 4,712,101; 4,724,715; 4,823,634; and 5,235,868, which are incorporated herein by reference.

Figure 4A:
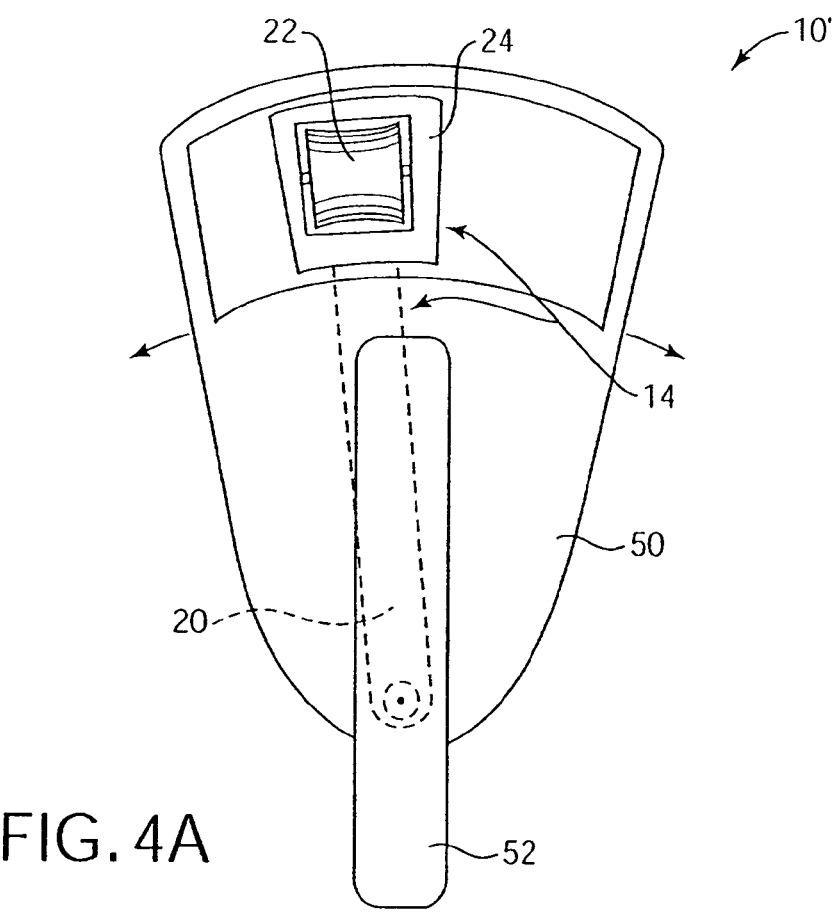
Figure 4B:
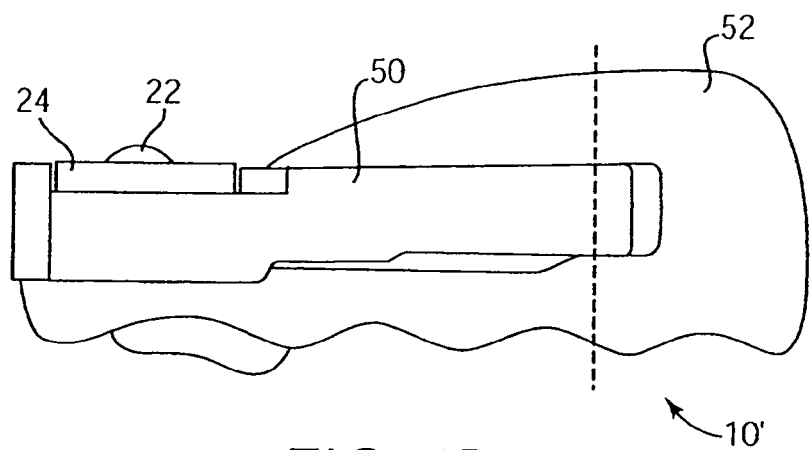

FIGS. 4a and 4b are top plan and side elevational views, respectively, of an alternate embodiment 10' of the control device 10, in which a molded hand grip is provided for the device. An arm assembly 14 and roller 22 are provided, which function similarly to the same components in the control device 10. The device includes a housing 50 and a grip 52. In some embodiments, the housing 50 can be moved relative to the grip about axis A to allow the player to adjust the relative positions of the grip and housing to a more convenient position to operate the device 10'. The grip preferably includes moldings 54 which are shaped to fit the user's fingers and provide a comfortable grip of the device. Furthermore, the underside of grip 52 can also include a button 56 which is conveniently accessible to the user's fingers. In some embodiments, this button 56 can be provided in addition to the switch 44 to provide additional input.

Figure 5:
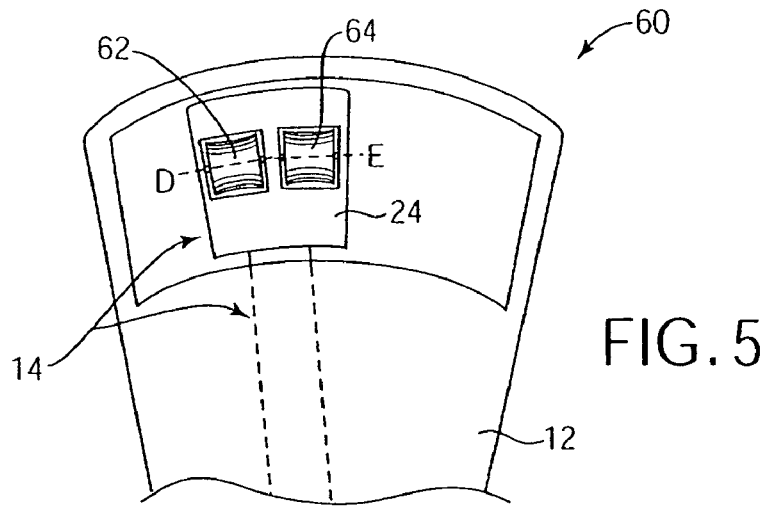
FIG. 5 is a partial top plan view of an alternate embodiment of the control device of the present invention including two aligned rollers.

FIG. 5 is a top plan view of an alternate embodiment 60 of the control device 10, in which two rollers 62 and 64 are provided on the carrier portion 24 of the arm assembly 14. Each roller 62 and 64 is independently rotatable from the other roller and preferably provides a separate input signal to a computer or other apparatus. Thus, each roller preferably is coupled to a dedicated sensor (not shown). In the embodiment shown, roller 62 is rotatable about axis D, and roller 64 is rotatable about axis E (axes D and E may be coincident in some embodiments). The control device thus provides three separate sensor signals: one from each of the rollers 62 and 64, and a third from the left-right motion of arm assembly 14. The cylinders 62 and 64 can be positioned in separate apertures in the carrier portion 24, as shown, or may be positioned on the same axle directly side-by-side or separated by a ridge or groove.

One example of a control setup for the control device 60 allows one roller to control X-axis movement of a graphical object, the left-right motion of the arm assembly to control Y-axis movement, and the other roller to control Z-axis movement, thus allowing three dimensional manipulation of objects or adjustment of values. In an alternate embodiment, the second roller 62 or 64 can be placed so that its axis of rotation is parallel to the axis of rotation of the other roller, e.g. one roller behind the other roller. Also, the second roller can be placed in other areas of arm 20, such as near the axis of rotation A so that the second roller still rotates with the arm; or on the housing near the axis A so that the second roller does not rotate with the arm.

Figure 6:
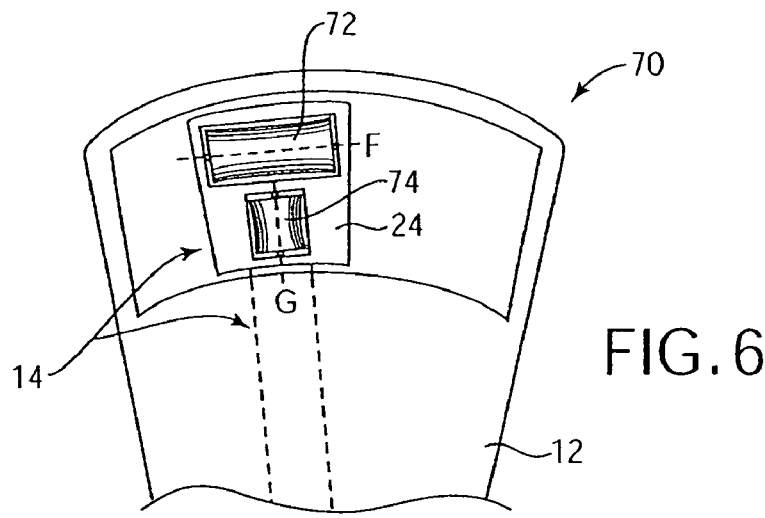
FIG. 6 is a partial top plan view of an alternate embodiment of the control device of the present invention including two orthogonal rollers.

FIG. 6 is a top plan view of an alternate embodiment 70 of the control device 10, in which two rollers are provided on the carrier portion 24 at different orientations. A first roller 72 is positioned to rotate about axis F, which is positioned approximately parallel to a tangential orientation to the rotation of the arm assembly about axis A. A second roller 74 is positioned to rotate about axis G, which is positioned approximately radially to the rotation of the arm assembly about axis A and approximately orthogonally to the orientation of axis F. Similar to the embodiment of FIG. 5, each roller 72 and 74 is preferably provided with its own sensor (not shown) so that independent input signals may be provided based on rotation of each roller. In one embodiment, the roller 72 can provide an input signal to control an object or function similar to the roller 22, while the roller 74 can provide an additional control feature for another function or value, such as movement in a third degree of freedom or axis. Alternatively, roller 74 might control coarse X-axis motion of the controlled object, where arm assembly motion provides fine X-axis control (or the roller 74 can control fine motion while the arm assembly controls coarse motion). This can allow X-axis control of a graphical object past the physical limits to motion of the arm assembly 14.

Figure 7:
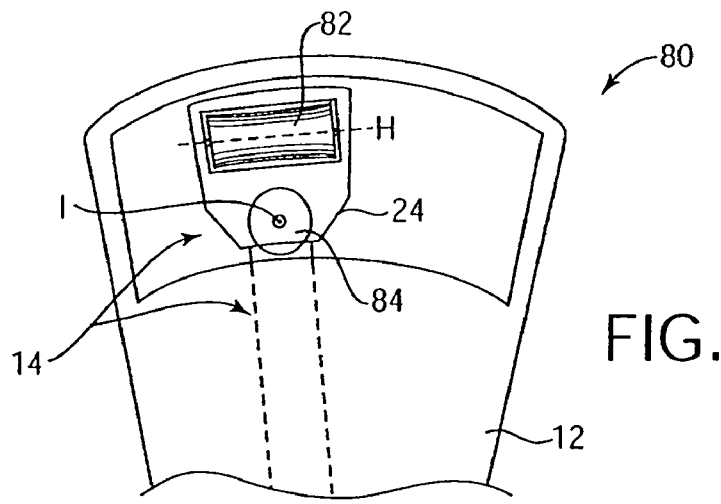
FIG. 7 is a partial top plan view of an alternate embodiment of the control device of the present invention including two orthogonal rollers having perpendicular axes of rotation.

FIG. 7 is a top plan view of an alternate embodiment 80 of the control device 10, in which a first roller 82 is provided in the carrier portion 24 as described above, and where the carrier portion 24 also includes a wheel 84. Roller 82 rotates about axis H, while wheel 84 rotates about axis I that is positioned approximately perpendicular to the plane of rotation of arm assembly 14 about axis A. Roller 82 and wheel 84 preferably provide independent input signals to a controlled apparatus, and thus are each detected by an individual sensor (not shown). As described with reference to FIG. 6, the roller 82 can provide the control functionality of roller 22 as described with reference to FIG. 1, and the wheel 84 can provide additional control functionality, such as coarse or fine control of X-axis movement or other movement, control of movement in a third degree of freedom, adjustment of a different value, etc. Wheel 84 is preferably a cylinder that provides a sufficient height to allow the user to comfortably engage the circumferential surface of the wheel. The user preferably engages wheel 84 on either side with a thumb, depending on which of the user's hands operates the control device 80.

Figure 8:
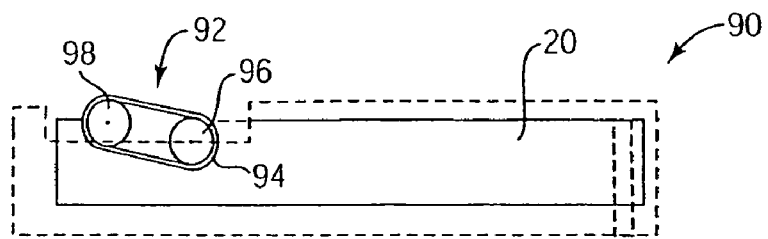
FIG. 8 is a side elevational view of an alternate embodiment of the control device of the present invention including a belt routed around two rollers.

FIG. 8 is a side elevational view of another embodiment 90 of the control device 10. In this embodiment, the roller 22 has been replaced with a belt assembly 92. Assembly 92 can be positioned in arm 20 or in carrier portion 24. A belt 94 is wrapped around two rollers 96 and 98 so that the user may cause the belt to travel around the rollers by engaging the belt with a finger and moving the belt toward the back or front of the device 10. The rollers 96 and 98 can be coupled to the arm member 20 by axles, similarly to roller 22. The belt 94 may be made of a frictional, stretching material such as rubber or the like, and can alternatively be provided with teeth that engage teeth in roller 96 and/or roller 98. Only one sensor need be provided to detect the motion of either roller 96 or roller 98. The sensor can be coupled to the rotating shaft of one of the rollers to detect its rotation. Alternatively, an optical sensor can be positioned to detect the passage of stripes or other marks that are printed on the belt, and thus measure the distance that the belt is moved. In some embodiments, an actuator can be coupled to either one of the rollers 96 or 98 to provide forces in the degree of freedom of movement of the belt. The movement of the belt 94 can be used to control, for example, the Y-axis motion of a controlled graphical object, or other motion or value. Furthermore, additional rollers can be included in arm assembly 14 in addition to the belt assembly 92, as shown in the embodiments of FIGS. 5-7.

Figure 9:
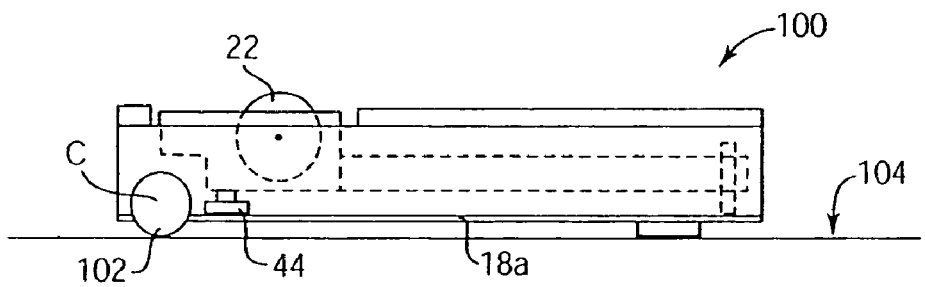
FIG. 9 is a side elevational view of an alternate embodiment of the control device of the present invention including a cylinder for frictionally engaging a flat surface.

FIG. 9 is a side elevational view of an alternate embodiment 100 of control device 10 in which the device 100 may be moved similarly to a mouse to provide additional input signals to a computer system or other apparatus. A cylindrical rotatable wheel 102 is preferably provided near the front of the device 100 and extends out of the bottom panel 18a so that it may contact a surface 104. The wheel 102 preferably rotates about an axis C when the control device 100 is pushed across surface 104 by a user. A sensor (not shown) is preferably used to detect the motion of wheel 102, similar to the sensor 34 used with roller 22. Thus, the user may provide a third input signal to a computer or other apparatus by moving the device 100 in a desired direction. This motion is isolated from the other inputs based on roller 22 and arm assembly 14 motion, since the wheel 102 is moved by movement of the arm and hand of the user, not the finger resting on the carrier portion 24 or roller 22.

The wheel 102 can facilitate forward and backward motion of the control device 100 while restricting left and right motion. The input from the wheel 102 can be used to control a third axis of movement for a controlled graphical object or entity, or can control some other value, such as velocity, volume, etc. Furthermore, the wheel 102 can be provided with an actuator in an alternate embodiment to provide force feedback in the degree of freedom of motion of the control device 100. In an alternate mouse embodiment, the left and right motion of the arm assembly 14 can be used to move a cursor along the horizontal axis, while the forward and back motion of the device 10 (detected by wheel 102) can be used to move the cursor along the vertical axis. This embodiment can be useful where there is not enough space to move the entire device to the left and right. The roller 22 in such an embodiment can be used for z-movement of the cursor or for a function not related to movement of the cursor.

In addition, the control device 100 can be provided with additional buttons, for example, on the top plate 18b to allow additional input signals. Switch 44 can be actuated similarly to the embodiment shown in FIG. 2, or alternatively, switch 44 can be provided as a button or switch on the bottom surface of bottom plate 18a so that a "mouse click" can be actuated by pressing downward on a switch on the rear of the control device, where the fingertips of the user are located. In other embodiments, wheel 102 can be oriented in an orthogonal direction to the direction shown in FIG. 9, so that the sensor for wheel 102 reads motion of the device 100 in a left-right degree of freedom. In yet other embodiments, the wheel 102 can be replaced by a ball or other spherical object; this allows two additional signals to be output by the control device. The control device could thus be moved in two planar dimensions similar to a mouse, and control movement or values in a similar fashion. This is shown in FIG. 10, below.

Figure 10:
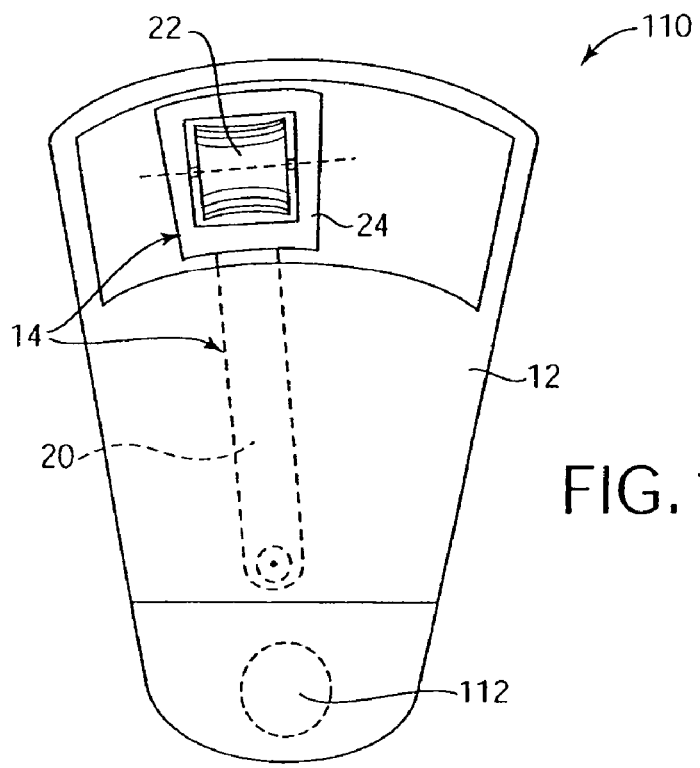
FIG. 10 is a side elevational view of an alternate embodiment of the control device of the present invention including a sphere for frictionally engaging a flat surface.

FIG. 10 is a top plan view of a different embodiment 110 of control device 10 in which a ball or sphere 12 is included at the back portion of the control device 110 to provide mouse-like functionality. Ball 112 can be held in place by multiple rollers, similar to standard mouse input devices, where two of the rollers are coupled to sensors to provide input signals for the horizontal movement and vertical movement, respectively, of the control device 110 on a surface. In a different embodiment, control device 110 can be provided with a wheel, similar to device 100, to input control signals for only one degree of freedom of movement (forward-back motion or left-right motion).

FIG. 11 is a top plan view of a different embodiment 120 of the control device 10 of the present invention, in which ball bearings are provided to allow the carrier portion 24 to move left and right in the opening 26 of the housing 12. Housing 12 preferably includes tracks 122 in the edges of opening 26, in which are seated ball bearings 124 which are rotatably coupled to the carrier portion 24. The ball bearings roll within the tracks as the carrier portion 24 is moved left or right within the opening 26, such that minimal friction is provided and smooth movement obtained. Thus, in such an embodiment, the arm member 20 is not required to permit movement of the carrier portion 24. In other embodiments, sliding bearing surfaces can be used; however, such bearings tend to introduce greater friction in the movement of the portion 24. The opening 26 and tracks 22 may be curved as shown in FIG. 11, or alternatively may be straight. A roller 22 or any other combination of rollers or wheels as described herein can be provided in the carrier portion 24.

Figure 12:
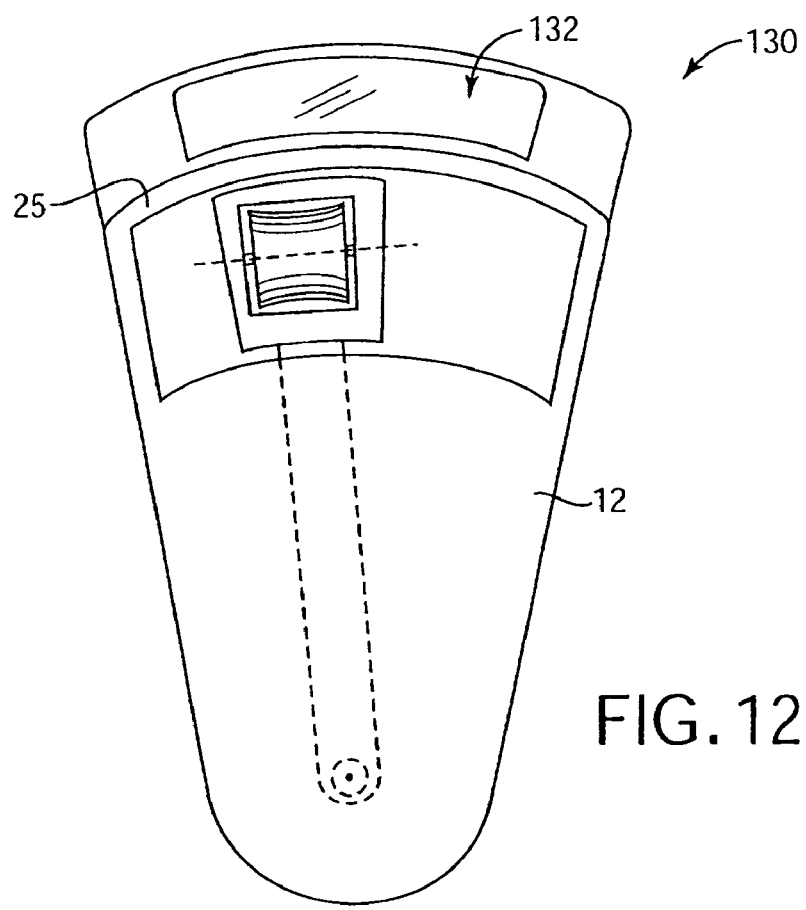
FIG. 12 is a top plan view of an alternate embodiment of the control device of the present invention including a display.

FIG. 12 is a top plan view of a different embodiment 130 of the control device of the present invention, in which a local display screen 132 is coupled to the housing of the control device. Screen 132 can display information either stored in memory local to the control device 10, or information received from an apparatus interfaced with the control device 130, such as a host computer or other device. For example, graphical and textual information can be displayed to assist the user in determining functions of the control device as related to the current program running on the host computer. In one example, as the user controls a displayed cursor over menu selections, information related to the menu selections from the host computer is displayed on the local display 132. In other embodiments, a larger display screen can be included to provide a self-contained, portable computer or game device, having graphical and textual images displayed thereon. The display screen 132 can be any of a variety of types of display devices, including LCD display, LED display, plasma display, etc. In some embodiments, display 132 can include a touch-sensitive surface to allow a user to touch displayed images directly on the display to select those images and an associated setting or function.

Figure 13A:
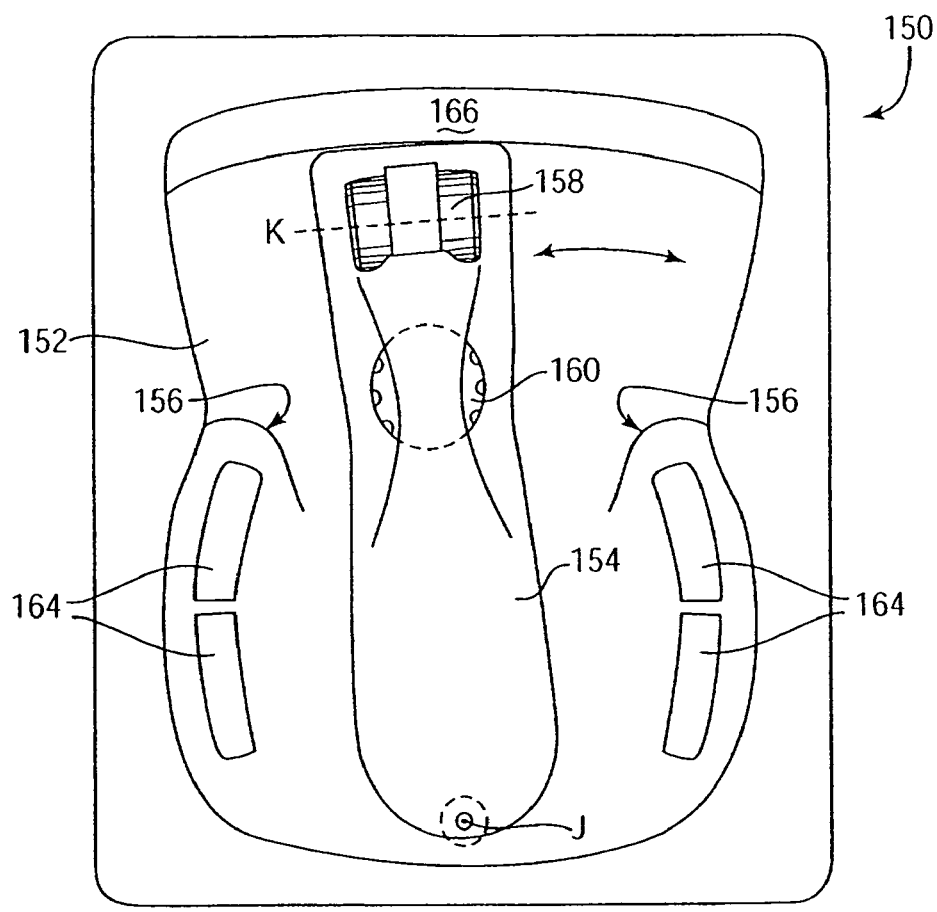
Figure 13B:
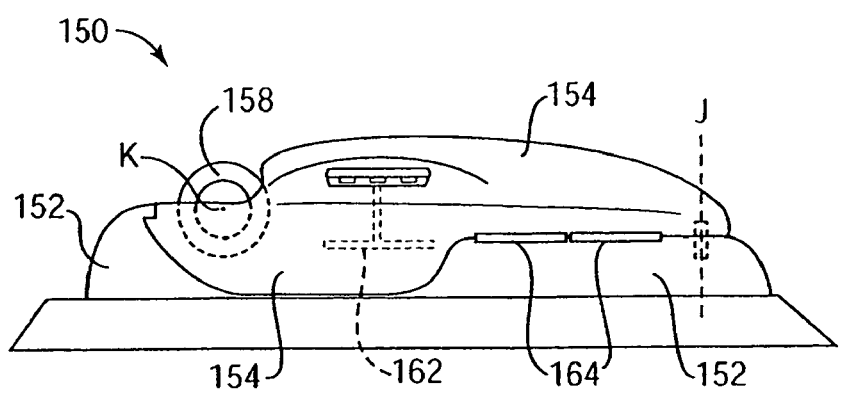

FIGS. 13a and 13b are top plan and side elevational views, respectively, of an alternate embodiment 150 of a control device of the present invention. Control device 150 includes a base 152 and an arm assembly 154. Base 152 rests on a stable surface such as a tabletop. The arm assembly 154 can rotate with respect to the base 152 about an axis J. Preferably, stops 156 are included to limit the rotation of the arm assembly to left and right positions. The arm assembly 154 includes a roller 158 which can be rotated about an axis K and provide an input signal as described in the embodiments above. Additional rollers can also be included that can provide additional input signals. Furthermore, the arm assembly 154 can also include a fine adjustment wheel 160. This wheel can be similar to the wheel 84 described above with respect to FIG. 7. Alternatively, wheel 160 can physically rotate the arm assembly 154 about axis J when the wheel is rotated. This can be accomplished, for example, by providing a rotatable contact member 162 that contacts a surface of the base 152 and rotates when the arm assembly 154 is rotated. Contact member 162 can be connected to wheel 160 so that when the wheel 160 is rotated, the contact member also rotates against the base 152 and forces the arm assembly to move. Buttons 164 can be included to provide additional input signals when pressed by a user.

When the device 150 is used by the user, the user preferably places his or her hand so that the index and middle fingers are positioned on the arm assembly and the palm of the hand is near the axis J. The index and middle fingers are preferably touching both the roller 158 and the base surface 166 to provide stability. The wheel 160 and the buttons 164 on the left side can be manipulated by the user's thumb (assuming the right hand is being used), while the buttons on the right can be manipulated by the user' ring and pinky fingers.

Figure 14:
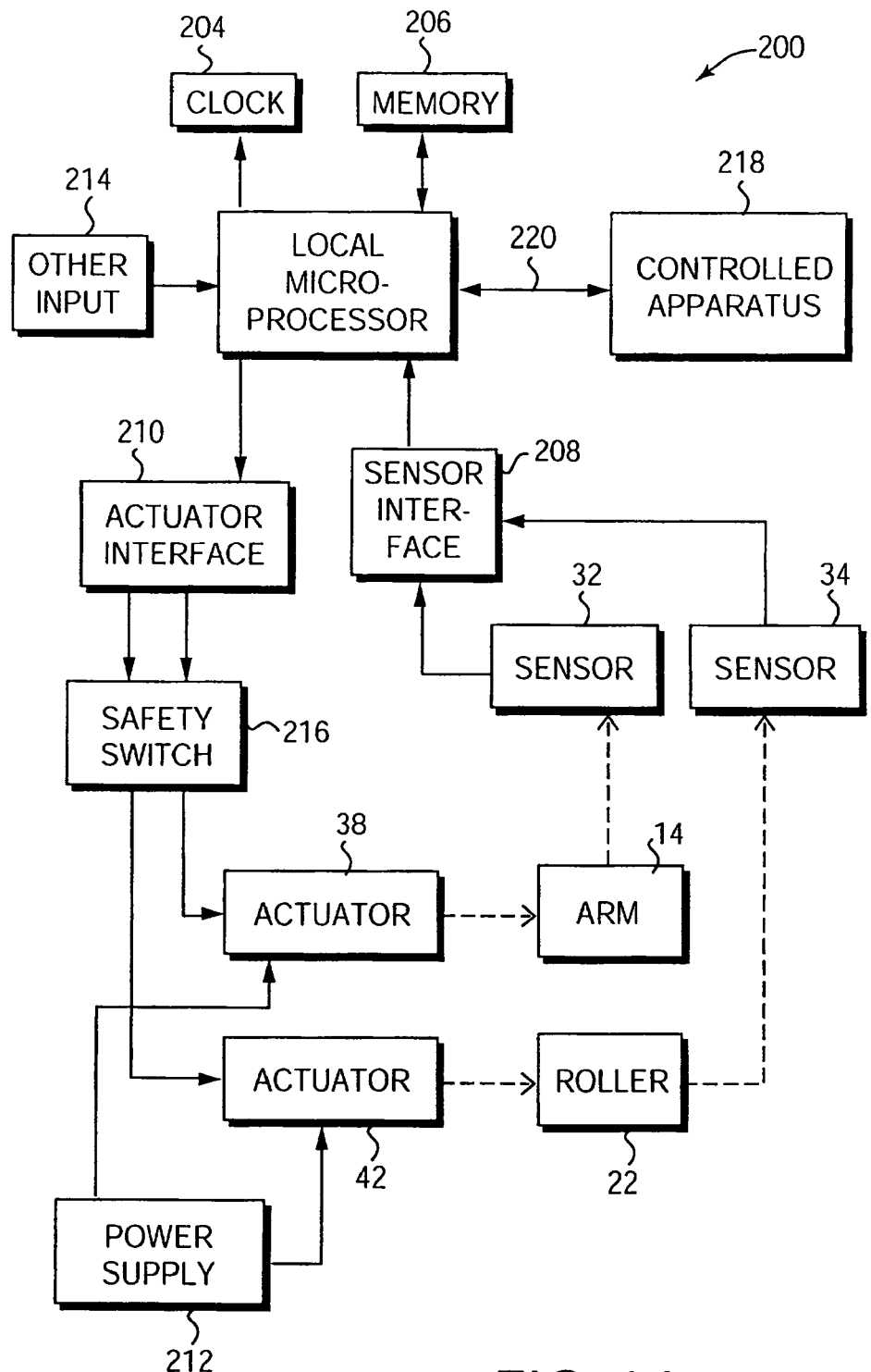
FIG. 14 is a block diagram of a control system for the control device of the present invention.

FIG. 14 is a block diagram illustrating an electromechanical system 200 suitable for user with the control device of the present invention. A force feedback system including many of the below components is described in detail in co-pending patent application Ser. No. 09/049,155, filed Mar. 26, 1998, and U.S. Pat. No. 5,734,373, which are both assigned to the assignee of the present invention and incorporated by reference herein in their entirety.

In one embodiment, device 10 includes an electronic portion having a local microprocessor 202, local clock 204, local memory 206, sensor interface 208, and actuator interface 210.

Local microprocessor 202 is considered "local" to device 10, where "local" herein refers to processor 202 being a separate microprocessor from any other microprocessors, such as in a controlling host computer or other apparatus 218, and refers to processor 202 being dedicated to force feedback and/or sensor I/O for the device 10. In force feedback embodiments, the microprocessor 202 reads sensor signals and can calculate appropriate forces from those sensor signals, time signals, and force processes selected in accordance with a host command, and output appropriate control signals to the actuator. Suitable microprocessors for use as local microprocessor 202 include the 8X930AX by Intel, the MC68HC711E9 by Motorola and the PIC16C74 by Microchip, for example. Microprocessor 202 can include one microprocessor chip, or multiple processors and/or co-processor chips, and can include digital signal processor (DSP) functionality. Also, "haptic accelerator" chips can be provided which are dedicated to calculating velocity, acceleration, and/or other force-related data. Alternatively, fixed digital logic and/or state machines can be used to provide similar functionality to microprocessor 202.

A local clock 204 can be coupled to the microprocessor 202 to provide timing data, for example, to compute forces to be output by actuator 70. Local memory 206, such as RAM and/or ROM, is preferably coupled to microprocessor 202 in interface device 10 to store instructions for microprocessor 202, temporary data, and other data. Display 132 can be coupled to local microprocessor 202 in some embodiments. Alternatively, a different microprocessor or other controller can control output to the display 132.

Sensor interface 208 may optionally be included in device 10 to convert sensor signals to signals that can be interpreted by the microprocessor 202. For example, sensor interface 208 can receive signals from a digital sensor such as an encoder and convert the signals into a digital binary number. An analog to digital converter (ADC) can also be used. Such circuits, or equivalent circuits, are well known to those skilled in the art. Alternately, microprocessor 202 can perform these interface functions. Actuator interface 210 can be optionally connected between the actuators 38 and 42 and microprocessor 202 to convert signals from microprocessor 202 into signals appropriate to drive the actuators. Actuator interface 210 can include power amplifiers, switches, digital to analog controllers (DACs), and other components, as well known to those skilled in the art. Actuator interface 210 circuitry can also be provided within microprocessor 202 or in the actuators.

A power supply 212 call be coupled to actuators 38 and 42 and/or actuator interface 210 to provide electrical power. In a different embodiment, power can be supplied to the actuators and any other components (as required) by an interface bus. Power can also be stored and regulated by device 10 and thus used when needed to drive the actuators.

Sensors 32 and 34 sense the position, motion, and/or other characteristics of arm assembly 14 and roller 22 along one or more degrees of freedom and provide signals to microprocessor 202 including information representative of those characteristics. A single compound sensor can be used for multiple degrees of freedom. Examples of sensors suitable for sensors 32 and 34 include optical encoders, analog sensors such as potentiometers, Hall effect magnetic sensors, optical sensors such as a lateral effect photo diodes, tachometers, and accelerometers. Furthermore, both absolute and relative sensors may be used.

In those embodiments including force feedback, actuators 38 and 42 are provided to transmits forces to arm assembly 14 and roller 22 in response to signals output by microprocessor 202 or other electronic logic or device, i.e., the actuators are "electronically-controlled." The actuators 38 and 42 produce electronically modulated forces which means that microprocessor 202 or other electronic device controls the application of the forces. In some embodiments, additional actuators can also be provided for other controls on device 10 (such as buttons, gamepad, etc.) or degrees of freedom of arm assembly 14. Actuators 38 and 42 can be active actuators, such as linear current control motors, stepper motors, pneumatic/hydraulic active actuators, a torquer (motor with limited angular range), voice coil actuators, etc.; or passive actuators, such as magnetic particle brakes, friction brakes, or pneumatic/hydraulic passive actuators. In some embodiments, sensor/actuator pair transducers can be used.

In some embodiments, a drive transmission such as a capstan drive mechanism can be used to provide mechanical advantage to the forces output by actuators 14 and/or 22. Some examples of capstan drive mechanisms are described in U.S. Pat. No. 5,731,804, incorporated herein by reference. Alternatively, a belt drive system, gear system, or other mechanical amplification/transmission system can be used.

Other input devices 214 can be included in control device 10 and send input signals to microprocessor 202. Such input devices can include buttons provided on various locations of housing 12 and/or carrier portion 24, used to supplement the input from the arm assembly and roller 22. Also, dials, switches, voice recognition hardware (e.g. a microphone, with software implemented by microprocessor 202), or other input mechanisms can be used. Furthermore, a safety or "deadman" switch 216 can optionally be included in those implementations providing force feedback. The safety switch prevents forces from being output when the user is not contacting the roller 22 or carrier portion 24, and to prevent these components from moving on their own when the user is not touching them. The safety switch can detect contact of a user's digit (finger, thumb, etc.) with the components using a sensor such as a capacitive sensor or resistive sensor, pressure sensor, optical sensor, etc.

Controlled apparatus 218 is preferably included to communicate with local microprocessor 202 or other electronic components of control device 10. Microprocessors 202 and 218 are preferably coupled together by a bi-directional bus 220. Additional electronic components may also be included for communicating via standard protocols on bus 220. These components can be included in device 10 or another connected device. Bus 220 can be any of a variety of different communication busses. For example, a bi-directional serial or parallel bus, a wireless link, or a uni-directional bus can be provided.

Controlled apparatus 218 can be any of a variety of devices, including a host computer, appliance, or other device as described with reference to FIG. 1a. Microprocessors 202 and apparatus 218 can exchange information as needed to facilitate control of various systems, output event notifications to the user, etc. For example, apparatus 218 can be a host computer including a microprocessor that commands the local microprocessor 202 to output force sensations by sending host commands to the local microprocessor. The host computer can be a personal computer, workstation, video game console, or other computing or display device, set top box, "network-computer", etc. Besides a microprocessor, the host computer preferably includes random access memory (RAM), read only memory (ROM), input/output (I/O) circuitry, and other components of computers well-known to those skilled in the art. The host computer can implement a host application program with which a user interacts using control device 10 and/or other controls and peripherals. The host application program can be responsive to signals from control device 10 such as the motion of the arm or knob, or button presses. In force feedback embodiments, the host application program can output force feedback commands to the local microprocessor 202, using, for example, a force feedback API of the host computer, such as [-Force from Immersion Corporation. In a host computer embodiment or other similar embodiment, microprocessor 202 can be provided with software instructions to wait for commands or requests from the host computer, parse/decode the command or request, and handle/control input and output signals according to the command or request.

For example, in one force feedback embodiment, a host computer can provide low-level force commands over bus 220, which microprocessor 202 directly transmits to the actuators. In a different force feedback local control embodiment, the host computer provides high level supervisory commands to microprocessor 202 over bus 220, and microprocessor 202 decodes/parses the commands and manages low level force control loops to sensors and actuators in accordance with the high level commands and independently of the host computer. In the local control embodiment, the microprocessor 202 can independently process sensor signals to determine appropriate output actuator signals by following the instructions of a "force process" that may be stored in local memory 206 and includes calculation instructions, formulas, force magnitudes (force profiles), and/or other data. The force process can command distinct force sensations, such as vibrations, textures, jolts, or even simulated interactions between displayed objects. Such operation of local microprocessor in force feedback applications is described in greater detail in U.S. Pat. No. 5,734,373, previously incorporated herein by reference.

In an alternate embodiment, no local microprocessor 202 is included in interface device 10, and a remote microprocessor in apparatus 218 controls and processes all signals to and from the components of interface device 10. Or, hardwired digital logic in device 10 can perform any input/output functions to the device 10.

While this invention has been described in terms of several preferred embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include such alterations, modifications, and permutations as fall within the true spirit and scope of the present invention.

That which is claimed is:

1. An apparatus comprising:
    a manipulandum movable in a first rotary degree of freedom and a second rotary degree of freedom, wherein an axis of rotation of the first rotary degree of freedom is substantially perpendicular to an axis of rotation of the second rotary degree of freedom;
    a sensor configured to detect a movement of the manipulandum and to output a first sensor signal associated with the movement;
    a first actuator operable to provide tactile feedback to the manipulandum in the first rotary degree of freedom, the tactile feedback associated with the first sensor signal;
    a second actuator operable to provide tactile feedback to the manipulandum in the second rotary degree of freedom, the tactile feedback associated with the first sensor signal; and
    a first processor operable to control the first actuator and the second actuator and to receive the first sensor signal from the sensor.

2. The apparatus of claim 1, wherein the sensor is further configured to detect a position of the manipulandum.

3. The apparatus of claim 2, wherein the sensor is further configured to detect the movement of the manipulandum from the position and to output a second sensor signal associated with the movement of the manipulandum from the position, the first processor configured to receive the second signal.

4. The apparatus of claim 2, wherein the first processor is configured to associate a value with the position of the manipulandum in a position control mapping mode and to control a rate of change of the value in a rate control mapping mode.

5. The apparatus of claim 4, wherein the first processor is operable to control the tactile feedback to the manipulandum in the rate control mapping mode.

6. The apparatus of claim 1, wherein the manipulandum comprises a roller.

7. The apparatus of claim 6, wherein the roller is configured to transmit a roller signal to the first processor.

8. The apparatus of claim 6, wherein the roller is moveable in two degrees of freedom.

9. The apparatus of claim 8, wherein the two degrees of freedom comprise a rotary degree of freedom and a translatory degree of freedom.

10. The apparatus of claim 1, further comprising a local display screen.

11. The apparatus of claim 1, wherein the first processor is included in one of a video game console, a computer, a Web-access device, or an electronic device.

12. The apparatus of claim 1, further comprising a second processor, separate from the first processor and operable to communicate with the first processor.

13. The apparatus of claim 1, further comprising a wireless communication interface operable to communicate with the first processor.

14. The apparatus of claim 1, wherein the movement comprises at least one of a distance, a direction, or a rate of change.

15. The apparatus of claim 1, wherein the movement is measured substantially in real-time.

* * * * *